(12) United States Patent
Black et al.

(10) Patent No.: US 12,030,757 B2
(45) Date of Patent: Jul. 9, 2024

(54) SYSTEMS AND METHODS FOR OPERATING AUTONOMOUS TUG ROBOTS

(71) Applicant: Brain Corporation, San Diego, CA (US)

(72) Inventors: John Black, San Diego, CA (US); Paul Behnke, San Diego, CA (US)

(73) Assignee: Brain Corporation, San Diego, CA (US)

( * ) Notice: Subject to any disclaimer, the term of this patent is extended or adjusted under 35 U.S.C. 154(b) by 642 days.

(21) Appl. No.: 17/140,468

(22) Filed: Jan. 4, 2021

(65) Prior Publication Data

US 2021/0147202 A1 May 20, 2021

Related U.S. Application Data

(63) Continuation of application No. PCT/US2019/040244, filed on Jul. 2, 2019.

(60) Provisional application No. 62/750,609, filed on Oct. 25, 2018, provisional application No. 62/694,134, filed on Jul. 5, 2018.

(51) Int. Cl.
*B66F 9/06* (2006.01)
*B62B 5/00* (2006.01)
*B66F 9/18* (2006.01)
*G05D 1/00* (2024.01)
*G05D 1/246* (2024.01)
*G05D 1/81* (2024.01)

(52) U.S. Cl.
CPC ............ *B66F 9/063* (2013.01); *B62B 5/0079* (2013.01); *B66F 9/18* (2013.01); *G05D 1/0061* (2013.01); *G05D 1/0246* (2013.01); *G05D 1/246* (2024.01); *G05D 1/81* (2024.01)

(58) Field of Classification Search
CPC .......... B66F 9/063; B66F 9/18; B62B 5/0079; G05D 1/0061; G05D 1/0246; G05D 2201/0216; G05D 1/246; G05D 1/81
See application file for complete search history.

(56) References Cited

U.S. PATENT DOCUMENTS 4,411,577 A * 10/1983 Shearer, Jr. .......... G05D 1/0234
340/686.2
6,435,803 B1 * 8/2002 Robinson .............. B62B 3/1404
414/539

(Continued)

FOREIGN PATENT DOCUMENTS

| KR | 20080105538 A | 12/2008 | |
| KR | 101369225 B1 | 3/2014 | |
| WO | WO8603168 A1 * | 6/1986 | ................ B60P 1/02 |

OTHER PUBLICATIONS

International Search Report and Written Opinion dated Sep. 30, 2019 for PCT/US19/40244.

(Continued)

*Primary Examiner* — Robert T Nguyen
*Assistant Examiner* — Karston G. Evans
(74) *Attorney, Agent, or Firm* — Reed Smith LLP; Sidharth Kapoor

(57) ABSTRACT

Systems and methods for operating autonomous tug robots are disclosed. Robotic tugs disclosed herein are configured to autonomously maneuver to a desired location to pick up and retrieve an item, such as a load or a cart, nest the item within the robot, transport the item, and deliver the item to a desired location.

17 Claims, 24 Drawing Sheets

(56) References Cited

U.S. PATENT DOCUMENTS

| | | | |
|---|---|---|---|
| 2010/0222925 A1* | 9/2010 | Anezaki | G05D 1/0251 |
| | | | 700/253 |
| 2013/0333971 A1 | 12/2013 | Perry et al. | |
| 2017/0072558 A1* | 3/2017 | Reynolds | G05D 1/0246 |
| 2017/0102711 A1* | 4/2017 | Watts | G05D 1/0268 |
| 2017/0329347 A1* | 11/2017 | Passot | G05D 1/0246 |
| 2017/0348061 A1 | 12/2017 | Joshi et al. | |
| 2017/0349166 A1* | 12/2017 | Anderson | B60W 30/02 |
| 2018/0319594 A1* | 11/2018 | Blevins | G05B 9/02 |
| 2023/0286788 A1* | 9/2023 | Habedank | B66F 9/07568 |

OTHER PUBLICATIONS

Supplementary European Search Report for EP 19831318, dated Mar. 14, 2022.

\* cited by examiner

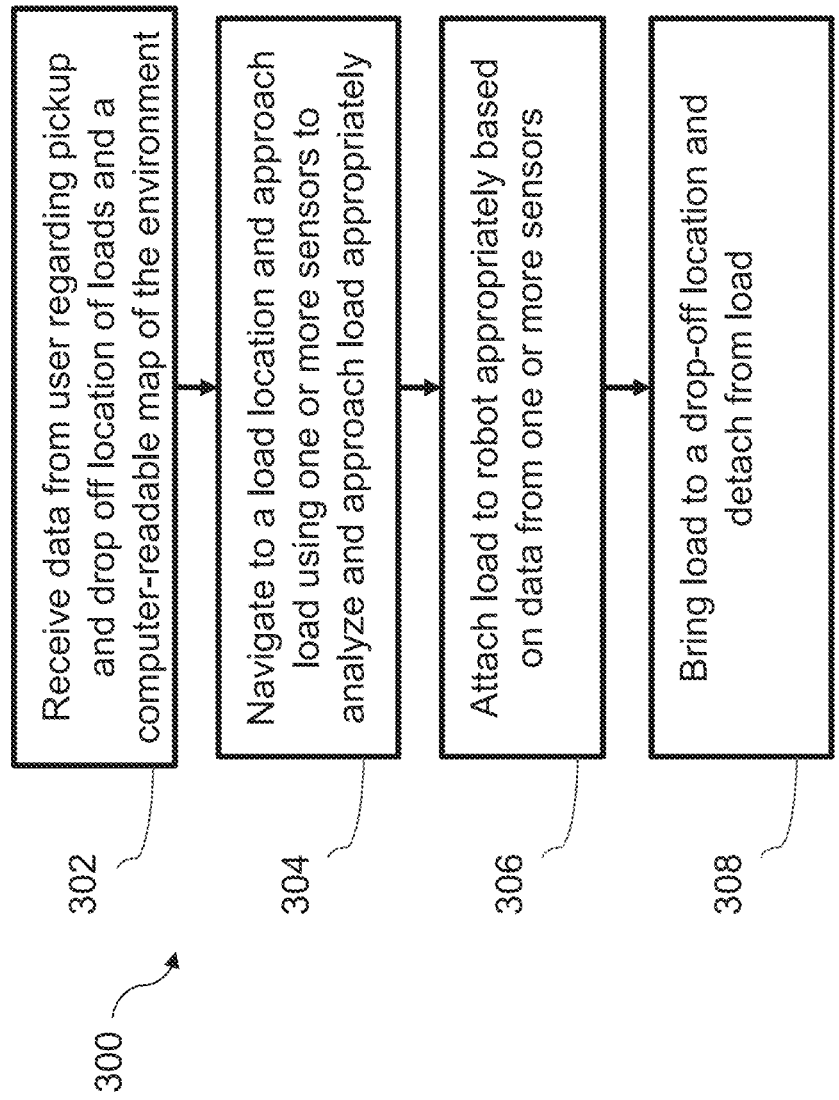

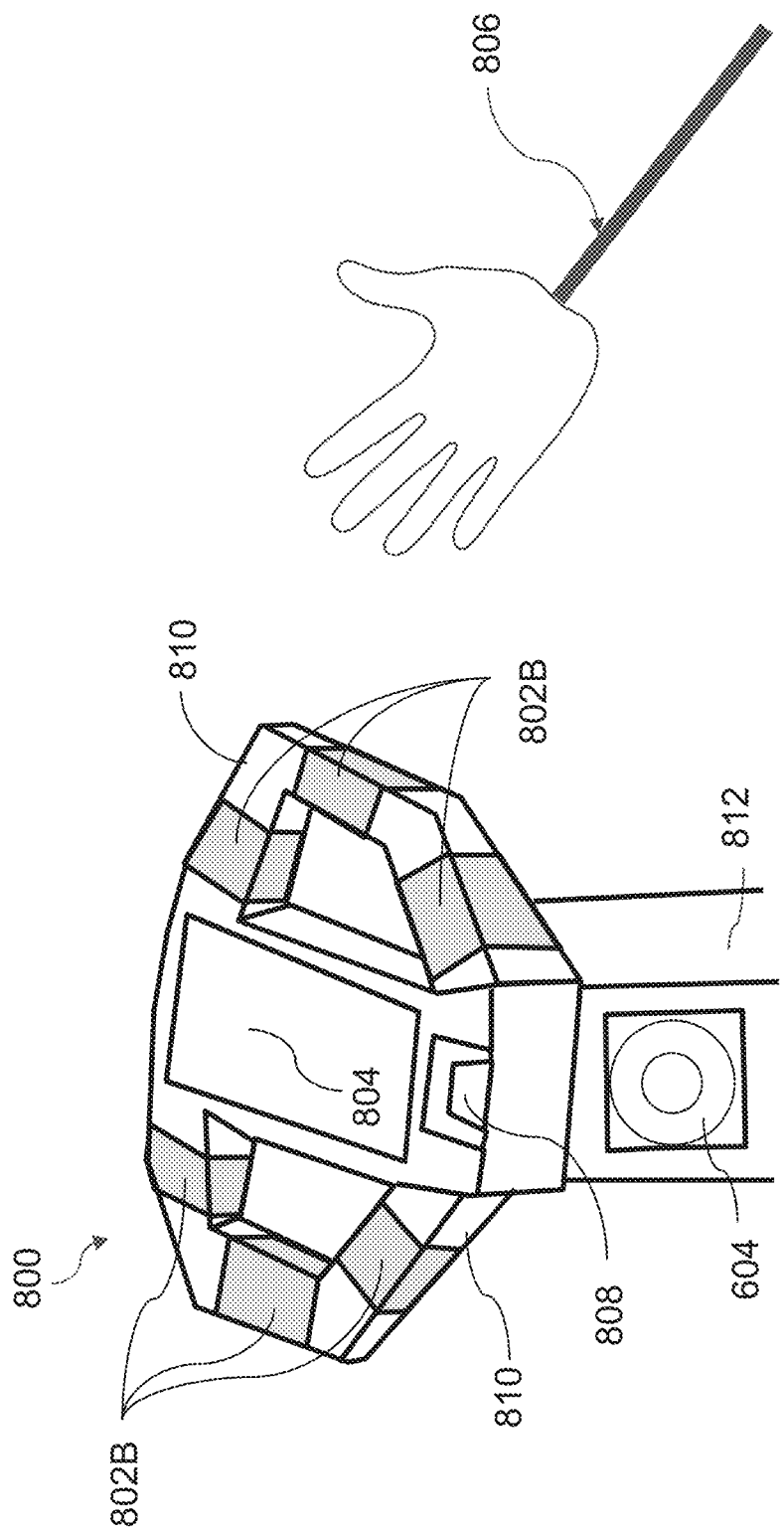

SYSTEMS AND METHODS FOR OPERATING AUTONOMOUS TUG ROBOTS

This application is a continuation of International Patent Application No. PCT/US19/40244 filed on Jul. 2, 2019 and claims the benefit of U.S. Provisional Patent Application Serial Nos. 62/694,134 filed on Jul. 5, 2018 and 62/750,609 filed on Oct. 25, 2018 under 35 U.S.C. § 119, the entire disclosures of each of which are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for operating autonomous tug robots.

Background

Currently, tugs may be used to transport items, equipment, and/or payloads from one location to another. These tugs are typically operated by humans to assist in moving heavy items easily as operating tugs may require less pulling force from the humans. In some exemplary embodiments, tugs contain mechanical and/or electronic components. These components are typically associated with reducing a required pulling force of the human to move a load. Typically, such tugs require a human operation to steer, drive, and/or move the tug.

Dollies are one example of a tug. Conventional dollies come in several forms. Manual dollies are pushed or pulled by an operator. In some exemplary embodiments, dollies may be powered, using propulsion by batteries and/or electric motors, to lessen the pulling force required by a user to move a load. However, in some exemplary embodiments, operation of a dolly, whether by manual operation or using electromechanical assisting components, can be time consuming and inefficient as it requires human interaction.

In general, use of tugs may require use of operators and, in some exemplary embodiments, skilled operators are required to transport items. As a result, tugs may be costly to operate from a time and labor perspective. Moreover, even when skilled operators use tugs, such use may be physically taxing to the operators. Accordingly, there is a need in the art for systems and methods for operating autonomous tug robots.

SUMMARY

The foregoing needs are satisfied by the present disclosure, which provides for, inter alia, systems and methods for operating autonomous tug robots. In some embodiments, the automotive features of a tug may be quickly disabled or enabled by a user. The robotic tug may be configured to pick up items and transport the items to destinations autonomously and/or manually.

Non-limiting exemplary embodiments described herein have innovative features, no single one of which is indispensable or solely responsible for their desirable attributes. Without limiting the scope of the claims, some of the advantageous features will now be summarized.

In one or more exemplary embodiments, a robotic tug is disclosed. In one exemplary implementation, the robotic tug includes: a load bearing component configured to attach or carry a load; one or more sensors configured to generate sensor data about the environment and load; one or more mechanical or electromechanical switches allowing for quickly switching between modes of operation; one or more actuators configured to move the robotic tug from one location to another; one or more navigation units configured to navigate the robot to destinations and around obstacles; a user interface configured to display and receive information; and at least one processor configured to: receive a set of instructions through user interface, wirelessly, or through wired connection regarding pickup and drop-off locations of loads; navigate the robot to and from loads using the one or more sensors, navigation units, and/or actuators; receive input from user to enable and/or disable automation; and navigate around obstacles and moving bodies.

In one or more exemplary embodiments, the robot includes user interface units configured to receive a selection of a created map from a user, wherein the robot autonomously navigates at least part of the received selection.

In one or more exemplary embodiments, the autonomous navigation of the robot is controlled in part by a user inputted map which may contain locations of loads, drop-off locations, and/or obstacles. In another exemplary embodiment, a robot may follow a human to learn a path, wherein the robot may store this route in the form of a computer readable map.

In one or more exemplary embodiments, the robotic tug further comprises a communications unit configured to receive a signal indicative at least in part of a location of loads, location of obstacles, communicate with other robots, and/or receive data wirelessly (e.g., from a cloud server, network, etc.).

In one or more exemplary embodiments, a robotic tug with an object attached thereto may be configured to autonomously follow a human operator, using one or more sensor units to localize the operator, to a drop-off location. Similarly, the robotic tug may autonomously follow a human operator to a location of a load to be transported to a different location.

In one or more exemplary embodiments, a method for moving a load with a robotic tug is disclosed. As used herein, a load may refer to one or multiple objects to be carried, pulled, attached to, or otherwise similarly transported by a robotic tug. In one exemplary embodiment, the method includes: autonomously navigating to a load location to pick up a stack of shopping carts; attaching the stack to the robotic tug; receiving instructions for a destination; travelling to the destination; and releasing the load at the destination.

In one or more exemplary embodiments, the method includes receiving a signal indicative in part of a load location. In another exemplary embodiment, the receiving destination instructions includes receiving a selection of destinations.

In one or more exemplary embodiments, a method for operating a robotic tug in a manual mode is disclosed. As used herein, manual mode may refer to the manual operation of a robotic tug by a human. In one exemplary embodiment, a robotic tug in manual mode may disable all, none, or some electronic components associated with automatous operation without disabling components desirable to a user (e.g., power steering, lift assistance, etc.).

In one or more exemplary embodiments, the robotic tug may receive input from an electromechanical switch, mechanical switch, or electronic sensor input, causing the robotic tug to quickly change its mode of operation. By means of non-limiting exemplary embodiments, this may be done to allow a human user to perform unique, difficult, or otherwise desirable tasks by operating the tug manually whilst reserving tedious and simple tasks for the robotic tug to execute in autonomous mode.

In one or more exemplary embodiments, a non-transitory computer readable storage medium having a plurality of instructions stored thereon, the instructions being executable by a processing apparatus to operate a robot. In one exemplary embodiment, the instructions are configured to, when executed by the processing apparatus, cause the robot to: go to a location to pick up a load; attach to or carry the load; receive one or more drop-off location(s); and travel to a drop-off location.

In one or more exemplary embodiments, the non-transitory computer readable storage medium includes instructions that, when executed by the processing apparatuses, are configured to detect a moving body and/or an obstacle in the sensor data. As used herein, obstacles may include a stationary object, moving body, terrain, and/or any other object/terrain that would impede the navigation of the robot along a route such as, without limitation, moving people, moving cars, and/or any curbs or sharp drops in the path of the robot. In another exemplary embodiment, the processor is further configured to adapt the movement of the robotic tug based at least in part on the detection of the moving body and/or obstacle.

In one or more exemplary embodiments, the non-transitory computer readable storage medium includes instructions that, when executed by the processing apparatus, causes the processing apparatus to receive a signal indicative in part of a pick-up location. In another exemplary embodiment, receiving one or more drop-off location(s). In another exemplary embodiment, receiving a signal indicative of identified obstacles along robot's current route.

In one or more exemplary embodiments, the non-transitory computer readable storage medium includes instructions that, when executed by the processing apparatus, cause the robot to: store its current task in memory; disable some, none, or all autonomous navigation units; disable some, none, or all sensors and instruments associated with autonomous operation; and enter manual mode. In another exemplary embodiment, the storage medium contains instructions that, when executed by the processing apparatus, restore autonomous mode by re-enabling the associated instruments and restore the task prior to entering manual mode from memory.

In one or more exemplary embodiments, the robotic system includes: a plurality of robots; one or more access points; a network communicatively coupled to the plurality of robots and the one or more access points, the network configured to: receive information from the one or more access points relating to load pick-up location for a first robot of the plurality of robots, cause the first robot to move to the pick-up location, and coordinate the movement of others of the plurality of robots to account for the movement of the first robot.

In one or more exemplary embodiments, multiple robots may be required to move multiple loads to multiple drop-off locations wherein the robots may communicate the location of loads requiring a robot to transport, ineligible/eligible drop-off destinations, obstacles, terrain, and/or location of themselves and other robots.

In one or more exemplary embodiments, the one or more access points comprises at least one electronic device containing a user interface allowing a human user to communicate with a plurality of robots at once. In another exemplary embodiment, an access point may be virtual (e.g., from a cloud, server, network, etc.) and may be distant from the robots which facilitate communication between a user and robot(s).

In one or more exemplary embodiments, the one or more access points comprises at least one electronic device containing a user interface allowing a human user to communicate with a plurality of robots at once. In another exemplary embodiment, an access point may be virtual (e.g., from a cloud, server, network, etc.) and may be distant from the robots which facilitate communication between a user and robot(s).

In one or more exemplary embodiments, systems, methods and operation of a non-transitory computer readable medium are discussed. As noted herein, discussion is made with respect to a system for moving objects by a robot from one location to another. One skilled in the art would appreciate that similar discussion and disclosure is pertinent and applicable to methods for moving objects by the robot, and at least one processor configured to execute computer readable instructions stored on a non-transitory computer readable medium. The system may comprise a memory having computer readable instructions stored thereon, and at least one processor configured to execute the instructions to, receive data from at least on sensor coupled to the robot; maneuver the robot from a first path to a different path based on detection of attachment of the object to the robot by the at least one sensor, the object being nested within the robot; and change direction of the robot from the first path to the second path upon detection of attachment of the object, the second path being determined based on the attachment of the object detected based on the received data from the at least one sensor. The second path taken by the robot may be same as the first path or different from the first path. The second path may be same from the first path in the sense that robot travels back along the first path that it just travelled prior to attachment of the load or object, but just in the reverse direction. The second path may be different from the first path in the sense that the second path travelled by the robot is a new path that it did not previously travel or undertake in reaching the load or object for attachment.

The processor is further configured to execute the computer readable instructions to switch the robot between an active mode and an inactive mode upon receiving input from the at least one sensor, wherein the at least one sensor corresponds to at least one switch. The at least one sensor configured to switch the robot between the inactive and active modes is located on a handle or armature of the robot, the handle or armature is configured to be pulled or pushed by a user to effectuate movement of the robot when the robot is in the inactive mode. The active mode corresponds to the robot operating autonomously; and the inactive mode corresponds to the robot operating under user control, the inactive mode comprises disabling autonomous features of the robot and the user control comprises the user pushing, pulling, or driving the robot.

The system may further comprise the robot utilizing a latch module to attach to the object, the latch module comprising a first latch including a first notch at a distal end of the first latch, the first notch configured to engage and disengage the object as the object slides into a first opening formed under the first notch; and a second latch including a second notch at a distal end of the second latch. The second notch configured to engage and disengage the object as the object slides into a second opening formed above the second notch, the second notch operatively coupled to the first notch. The robotic system is configured such that the object, upon attachment to the robot, comprises a same turn center as the robot, the turn center comprises a point about which the robot and the attached object turn as the robot executes a turn with the object attached. The object and the robot comprise the same turn center as the object is nested between two longitudinal beams of the robot. The object being coupled to the robot via the latch module, the latch module configured to hold the cart in a fixed position relative to the robot. As discussed above, the disclosure with respect to system is pertinent and applicable, and one skilled in the art would appreciate that it provides written description support to the inventive concepts directed to method and non-transitory computer readable mediums.

In one or more exemplary embodiments, a tug robot may comprise a footplate upon which a user may stand to operate the tug in an inactive mode by driving the tug using a steering wheel and throttle. The footplate may further comprise a switch for changing between active and inactive modes corresponding to autonomous and manual operation of the robotic tug, respectively.

These and other objects, features, and characteristics of the present disclosure, as well as the methods of operation and functions of the related elements will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 3 is a process flow diagram of an exemplary method for the robotic tug to find, navigate to, and retrieve a load in accordance with some embodiments of this disclosure.

FIG. 8A-8B are exemplary illustrations of the implementation of an electromechanical or mechanical switch allowing a user to operate the tug in manual mode.

Figure 1:
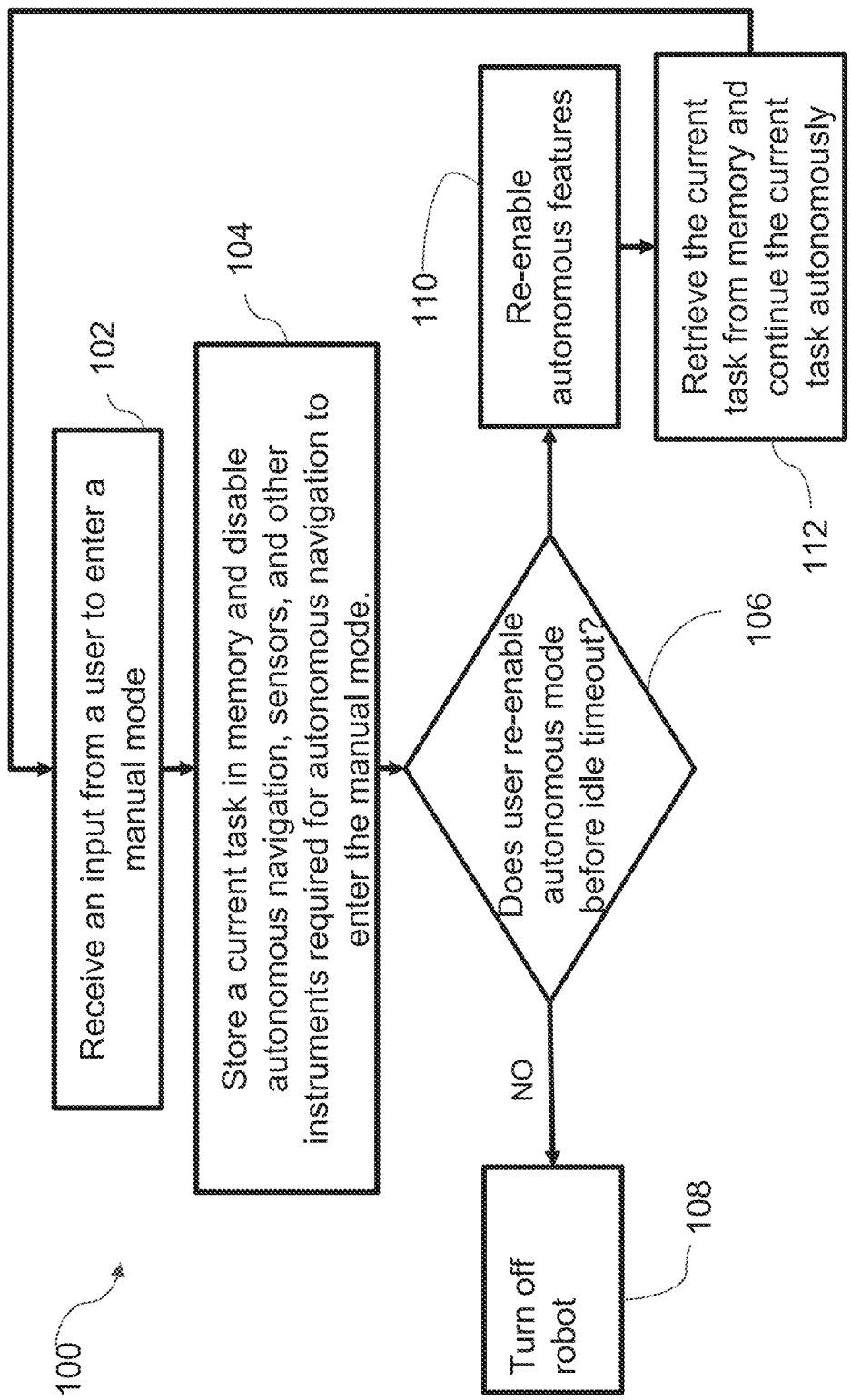
FIG. 1 is a process flow diagram of an exemplary method for enabling and disabling manual operation of the tug in accordance with some exemplary embodiments of this disclosure.

All figures disclosed herein are © Copyright 2021 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus can be implemented, or a method can be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein can be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved robotic tugs. Some embodiments of the present disclosure relate to robots, such as robotic tugs. As used herein, a robot can include mechanical and/or virtual entities configured to carry out a complex series of actions automatically. In some exemplary embodiments, robots can be machines that are guided and/or instructed by computer programs and/or electronic circuitry. In some exemplary embodiments, robots can include electro-mechanical components that are configured for navigation, where the robot can move from one location to another. Such robots can include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots can also include any autonomous and/or semi-autonomous machine for transporting items, people, animals, cargo, freight, objects, luggage, and/or anything desirable from one location to another. In some exemplary embodiments, such robots used for transportation of items can include robotic tugs as the robots are mobile systems that can navigate and/or move autonomously and/or under manual control of a user. These robotic tugs can include autonomous and/or semi-autonomous dollies, platform trucks, pull carts, wagons, caddies, and/or any substantially similar apparatus used for assisting transportation of items, loads, and/or things.

As used herein, tugs can include tugs that are manually controlled (e.g., driven, pushed, or remote controlled), powered (e.g., run using a motor and/or actuators), and/or autonomous (e.g., using little to no direct user control). For example, tugs can include apparatuses used by people wanting to transport items/loads which are otherwise too heavy, large, or any additional features that would make transportation difficult. Tugs can include any number of wheels and wheels of different sizes. In some exemplary embodiments, tugs have an armature for which an occupant can pull/push the tug. In some exemplary embodiments, tugs can also include apparatuses commonly referred to by other names, such as dollies, platform trucks, caddies, pull carts, wagons, and/or any other substantially similar apparatuses.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

The term "user" as used herein can encompass any operator of the robotic tug that can determine the tasks that the system carries out. According to one non-limiting exemplary embodiment, an operator of the robotic device can be non-human (e.g., another robot, cloud server, etc.) with the capability of telling the robotic device where to go, what to do, and/or operating the robotic tug as a manual tug (e.g., via wired/wireless communication of signals).

As used herein, computer program and/or software can include any sequence or human or machine cognizable steps which perform a function. Such computer program and/or software can be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link can include a causal link between any two or more entities (whether physical or logical/virtual), which enables information exchange between the entities.

Certain examples are described herein with reference tugs or dollies, or robotic tugs or robotic dollies. Such examples are used for illustration only, and the principles described herein may be readily applied to robotic tugs generally.

Detailed descriptions of the various embodiments of the system and methods of the disclosure are now provided. While many examples discussed herein may refer to robotic tugs, it will be appreciated that the described systems and methods contained herein are applicable to any kind of robot. Myriad other example embodiments or uses for the technology described herein would be readily envisaged by those having ordinary skill in the art, given the contents of the present disclosure.

Advantageously, the systems and methods of this disclosure at least: (i) allow robots to safely operate in tight or constrained environments; (ii) provide flexibility to users allowing the robot to work autonomously or under manual control at a user's discretion; (iii) allow a process flow for robots to work in their corresponding environment; (iv) reduce resource costs, such as labor, time, and energy; and (v) improve the efficiency, cost-effectiveness, and/or time of transportation of loads. Other advantages are readily discernable by one having ordinary skill in the art given the contents of the present disclosure.

In one or more exemplary embodiments, a tug robot is disclosed. The robot can include a non-transitory computer readable storage medium containing computer readable instructions that, when executed, navigate the robot autonomously in accordance with systems and methods of the present disclosure. Advantageously, the instructions in conjunction with sensor data can allow effective navigation of the robot from one location to another with little to no direct operator control. By means of illustration, the robotic tug can carry a stack of shopping carts, such as a collection of shopping carts lined end-to-end in a parking lot after customers have finished using the carts and tug them to the store do a designated location (e.g., a storefront). The robotic tug can also carry any item, load, and/or thing desired that can be attached, lifted onto, or otherwise carried by the tug. Accordingly, an advantage of the present disclosure is the effective transportation of items, loads, and/or things. Moreover, such transportation can be made with reduced dependency on labor (e.g., of another operator) reducing the time, energy, and/or cost of the transportation.

In one or more exemplary embodiments, the non-transitory computer readable storage medium contains computer readable instructions that, when executed by the processing apparatus, quickly switch a robotic tug manual mode to autonomous operation after receiving user input via either an electromechanical or mechanical switch. In some exemplary embodiments, this input can come from an electromechanical switch, mechanical switch, or electronic sensors located on the handles of the tug. In some exemplary embodiments, this input switch may be in the form of a foot pedal near the base of the tug.

In one or more exemplary embodiments, the non-transitory computer readable storage medium contains computer readable instructions that, when executed by the processing apparatus, navigate the robotic tug to loads and drop-off locations. In some exemplary embodiments, the computer readable instructions can come from a user interface, transmitted via Bluetooth, uploaded wirelessly or through cable to the robotic tug. In some exemplary embodiments, the computer readable instructions can include, but not limited to, navigating around a map of the environment, locating any known obstacles, and attaching/detaching loads to the robotic tug. In some exemplary embodiments, a map and/or route can be learned by the robot by following a human user along a path. In some exemplary embodiments, the robotic tug can be navigated utilizing markings (e.g., visual markings, sound-emitting markers, electromagnetic signal emitting markers, etc.) on the ground and/or at load and drop-off locations.

In one or more exemplary embodiments, the non-transitory computer readable storage medium contains computer readable instructions that, when executed by the processing apparatus, navigate the robotic tug around obstacles, which may or may not be stationary, utilizing a plurality of sensors, navigation, and actuator units. In one exemplary embodiment, a robotic tug retrieving shopping carts in a parking lot can encounter stationary items on the ground, moving or stationary cars, other robots, impassable terrain, and/or moving or stationary people and must navigate around these obstacles autonomously.

In one or more exemplary embodiments, a load requiring a tug can be at a location far away from the tug. Conventional tugs can require an operator to move a load to a different location, usually far enough away from the starting location to desire the use of a tug. However, a robotic tug in accordance with some embodiments of this disclosure can navigate to that location of the load in order to pick up or attach to the load and bring it to the desired location autonomously. Conventional tugs can require an operator to push the tug to another location for further use, storage, service, and/or any other desired action. However, a robotic tug in accordance with some embodiments of this disclosure can navigate to such location with little to no direct operator control. Accordingly, an advantage of the systems and methods of the present disclosure is the efficient management of tugs (e.g., shopping cart collectors, dollies, etc.) while reducing the labor required for such management.

By means of illustrative exemplary embodiment, certain locations where tugs are used (e.g., shopping malls, warehouses, retail stores, airports, office buildings, city centers, schools, and/or public or private places) can be heavily congested and/or chaotic. Accordingly, humans navigating around these robots can be difficult. In some exemplary embodiments, such as cases of emergency, convenience, or at the user's discretion, the tug's autonomous features can be disabled through an electromechanical switch, mechanical switch, or electronic sensors, allowing for manual use of the tug.

In one or more exemplary embodiments, a robotic tug in accordance to some embodiments of the present disclosure can also navigate with no items, loads, and/or desired things attached or carried.

In one or more exemplary embodiments, the human can perform a unique task with the tug in manual mode wherein programing the tug to perform such task autonomously would be less convenient and/or less efficient than performing the task manually.

In one or more exemplary embodiments, the robot will not return to autonomous mode if the user does not re-enable or activate the autonomous mode. Thereby, causing the robot to remain in manual mode or automatically shut off after exceeding a set threshold of idle time.

In one or more exemplary embodiments, a robotic tug with an object attached thereto may be configured to autonomously follow a human operator, using one or more sensor units to localize the operator, or to drop off the object at a location. Similarly, the robotic tug may autonomously follow a human operator to a location of a load to be transported to a different location.

Moreover, where a plurality of robotic tugs are used, systemic organization and order can increase, allowing for further reduction in collisions. For example, in some exemplary embodiments of the present disclosure, a plurality of robotic tugs (e.g., shopping cart tugs) can detect each other, communicate, and/or be centrally controlled. Accordingly, the robotic tugs can synchronize, move in coordination, and/or send/receive signals enhancing the ability of the robotic tugs to avoid one another. Advantageously, such ability can reduce collisions. Moreover, such ability can improve the efficiency of the task by reducing redundant movements (e.g., avoiding already retrieved loads by other robots).

In one or more exemplary embodiments, systems and methods can allow for use of robots with relatively few or no modifications to an environment. Certain contemporary solutions involving robots can require users to install rails, beacons, markers, lines, and/or cues for the robot to navigate. In some exemplary embodiments, such installations can be costly from a time, money, and/or aesthetic perspective. Such installations can also cost/require resources to maintain. Moreover, the installations can create failure points in robotic solutions, causing at least a portion of the solution to fail if one or more aspects of the installations do not operate as intended. Advantageously, systems and methods of this disclosure can allow robotics to rely on relatively few or no installations in some exemplary embodiments. Yet, in some exemplary embodiments, changes to the environment can be made in accordance with aspects of this disclosure in order to enhance efficiency and workflow.

In one or more exemplary embodiments, a non-transitory computer readable storage medium comprising a plurality of instructions embodied thereon is disclosed. The instructions, when executed by one or more processors, configures the one or more processors to, receive data from at least on sensor coupled to the robot; maneuver the robot from a first path to a different path based on detection of attachment of the object to the robot by the at least one sensor. Wherein, the object is nested within the robot. The one or more processors is further configured to execute the computer readable instructions to change direction of the robot from the first path to the second path upon detection of attachment of the object, the second path being determined based on the attachment of the object detected based on the received data from the at least one sensor. The instructions further configure the at least one processor to: switch the robot between an active mode and an inactive mode upon receiving input from the at least one sensor, wherein the at least one sensor corresponds to at least one switch. The at least one sensor configured to switch the robot between the inactive and active modes is located on a handle or armature of the robot, the handle or armature being configured to be pulled or pushed by a user to effectuate movement of the robot when the robot is in the inactive mode. The active mode corresponds to the robot operating autonomously and the inactive mode corresponds to the robot operating under user control. The user control comprises a user pushing, pulling, and/or driving of the robot. The computer readable instructions may further configure the at least one processor to provide a control signal to a rotational motor of a latch module to configure opening and closing of the latch module, the latch module further comprising: a first latch including a first notch at a distal end of the first latch, the first notch configured to engage and disengage the object as the object slides into a first opening formed under the first notch; and a second latch including a second notch at a distal end of the second latch, the second notch configured to engage and disengage the object as the object slides into a second opening formed above the second notch, the second notch operatively coupled to the first notch.

In one or more exemplary embodiments, a method for operating a robot as a tug is disclosed. The method comprises one or more processors of the robot, receiving data from at least one sensor coupled to the robot; maneuvering the robot from a first path to a different second path based on detection of attachment of the object to the robot by the at least one sensor, the object being nested within the robot; and changing direction of the robot from the first path to the second path upon detection of attachment of the object, the second path being determined based on the attachment of the at least one object detected based on the received data from the at least one sensor. The method may further comprise the at least one processors witching the robot between an active mode and an inactive mode upon receiving input from the at least one sensor, wherein the at least one sensor corresponds to at least one switch. The at least one sensor configured to switch the robot between the inactive and active modes is located on a handle or armature of the robot, the handle or armature being configured to be pulled or pushed by a user to effectuate movement of the robot when the robot is in the inactive mode. The active mode corresponds to the robot operating autonomously and the inactive mode corresponds to the robot operating under user control. The user control comprises a user pushing, pulling, and/or driving of the robot. The method may further comprise utilizing a latch module to attach the robot to the object, the latch module comprising: a first latch including a first notch at a distal end of the first latch, the first notch configured to engage and disengage the object as the object slides into a first opening formed under the first notch; and a second latch including a second notch at a distal end of the second latch, the second notch configured to engage and disengage the object as the object slides into a second opening formed above the second notch, the second notch operatively coupled to the first notch. The object, when attached to the robot, comprises a same turn center as the robot, the turn center comprising a point about which the robot and attached object turn as the robot executes a turn with the object attached or nested therein. The object and the robot comprise the same turn center, wherein the object is nested between two parallel, spaced apart longitudinal beams of the robot. The object coupled to the robot via a latching mechanism, the latching mechanism configured to hold the cart in a fixed position relative to the robot.

FIG. 1 is a process flow diagram of a method 100 for switching between autonomous and manual mode of a robot 402, with reference to FIG. 4A below, according to an exemplary embodiment. It is appreciated that a robot 402 or controller 422 of a robot 402 performing a task comprises the controller 422 executing computer readable instructions from a non-transitory memory 424 of the robot 402.

Figure 8A:
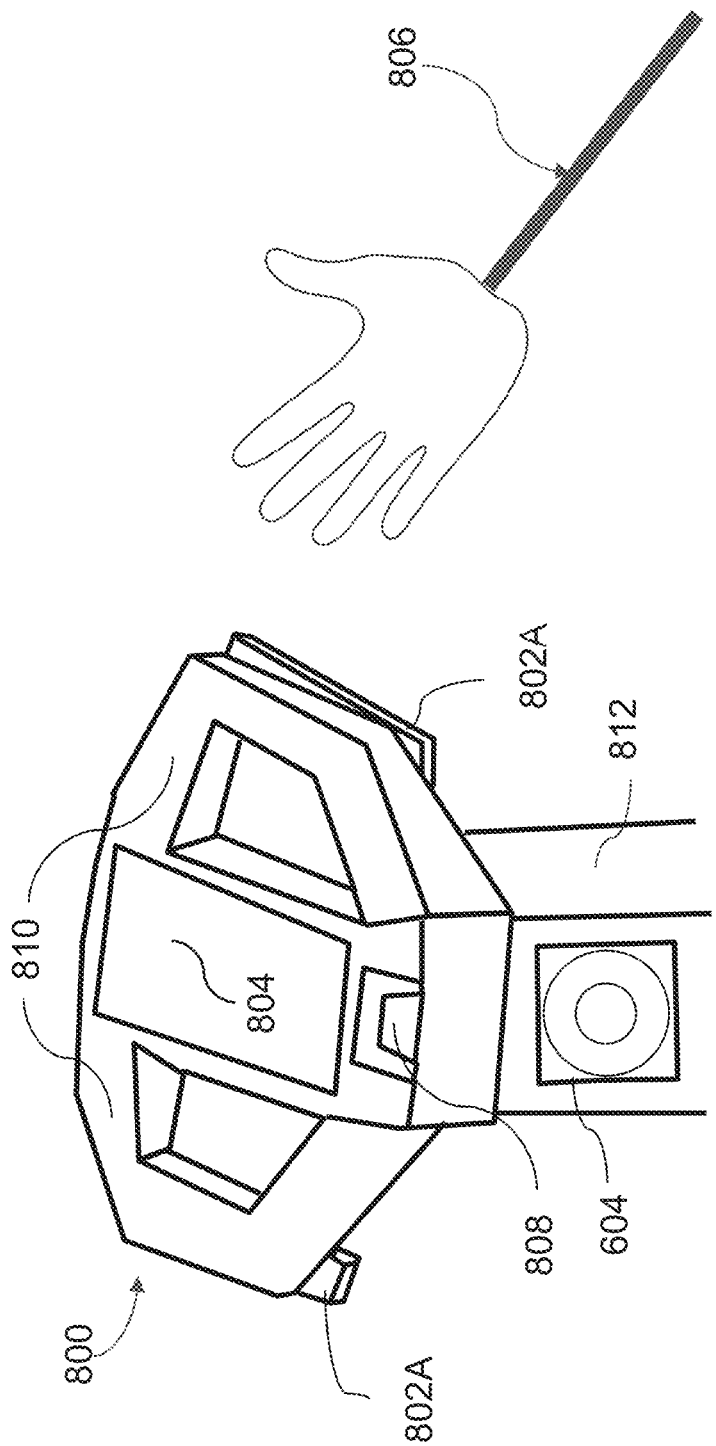

Block 102 includes robot 402 receiving input from a user to enter a manual mode. The input may comprise of a detection of an input from a sensor of the robot 402 such as, for example, an input from switches 802A-B of sensor units 414 by user 806, as illustrated in FIGS. 8A-B below. In some embodiments, the input may be received via a user interface (e.g., user interface 804 of FIG. 8A-B, user interface 1112 of FIG. 11, user interface units 412 of the robot 402, or external user interface communicatively coupled to the robot 402).

Figure 4A:
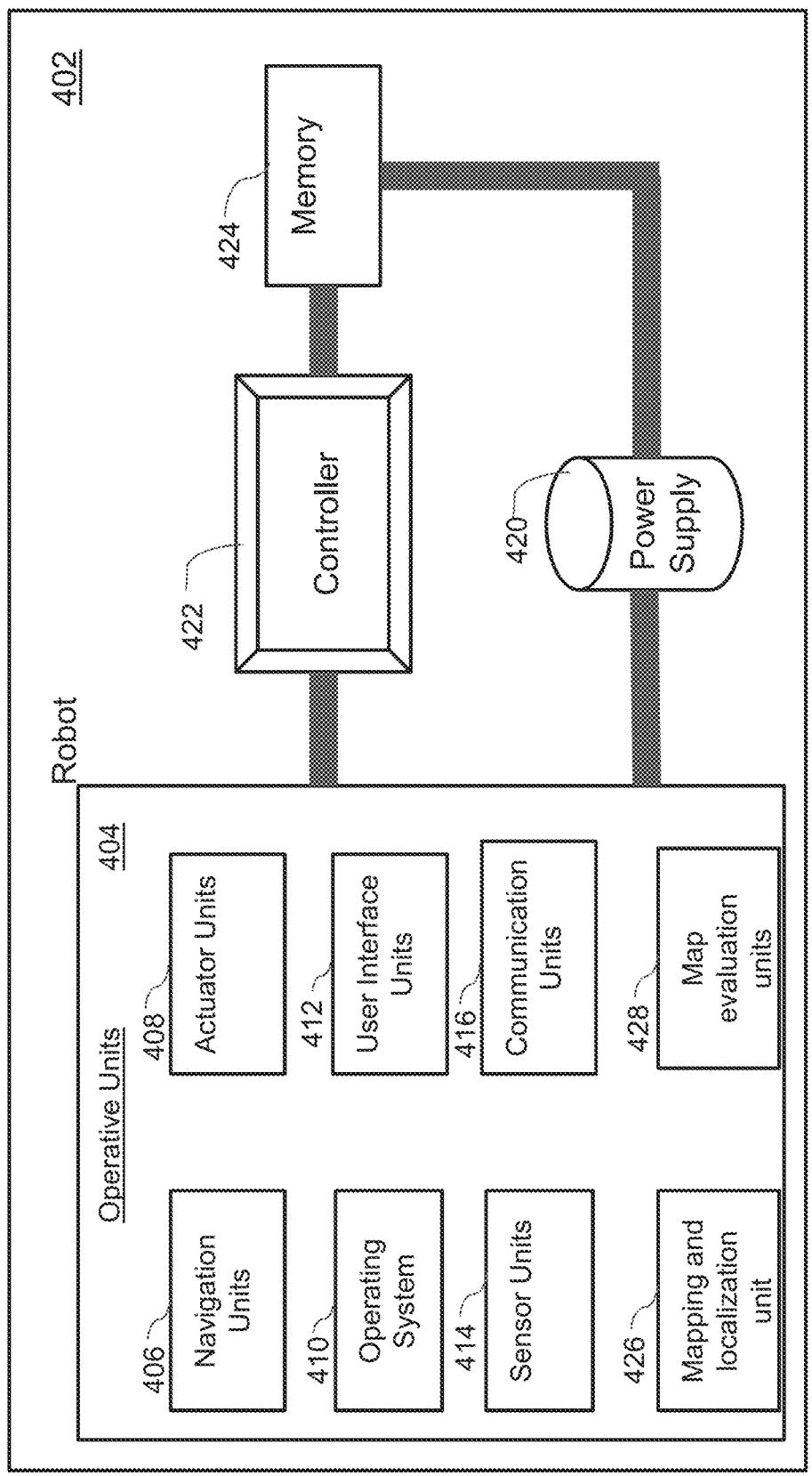
FIG. 4A illustrates a diagram of an overall view of a robotic device and components therein.

Block 104 includes controller 422 storing a current task of the robot 402 in memory unit 424, as illustrated in FIG. 4A, wherein storing the current task may comprise of, for example, storing a partially executed route, storing a target destination, or storing metrics corresponding to completion of the current task (e.g., 80% complete). That is, a task of the robot 402 comprises any functionality which the robot 402 may perform (e.g., cleaning floors, navigating a route, tugging shopping carts, etc.), wherein the functionality is performed by a controller 422 of the robot 402 executing a sequence of computer readable instructions from a memory 424 to generate outputs to one or more operative units 404. In some exemplary embodiments, controller 422 may disable some, none, or all of navigation units 406, sensor units 414, actuator units 408, and/or brake release units (not shown) utilized for autonomous navigation. According to at least one exemplary embodiment, robot 402 may comprise of a braking system designed to stop or slow down the robot in autonomous mode wherein, upon receiving input from the user to enter manual mode, the braking system can be disabled or manually operated by the user. Additionally, block 104 includes robot 402 entering manual mode such that robot 402 can be operated as a manual tug by an operator. In turn, it would be appreciated by one skilled in the art that robot 402 can switch between manual and autonomous modes. The current task of the robot 402 may include, for example, autonomously navigating to a particular location in an environment where an object in the environment needs to be tugged to a different location in the environment, wherein the user input may halt (i.e., pause) the autonomous execution of this task during the operation in the manual mode.

According to at least one non-limiting exemplary embodiment, autonomous features disabled in block 104 may depend on an attachment of a load to the robot 402. For example, with a load attached, power steering and/or actuator units 408 may assist a user operating the robot 402 manually (e.g., by reducing a pulling force by the user to tug the robot 402) and may remain activated in the manual mode while the load is attached. When no load is attached, the power steering and/or actuator units 408 may be disabled completely.

Block 106 includes robot 402 in manual mode awaiting user input to re-enable or activate autonomous features if input is received within a certain time-period. If no user input is received within a timeout period to re-enable the autonomous mode, to the robot 402 will power off. In some exemplary embodiments, a human may use this robot in manual mode for a unique, difficult, emergency, or otherwise conventional purpose. Robot 402 will stay in manual mode until receiving another input from sensor/switch 802 by user 806, further illustrated in FIGS. 8A-B.

Block 108 includes robot 402 shutting down (i.e., disabling power) if no input from sensors 414 (e.g., lack of movement of wheels, recognizing robot is in a same location, etc.) is detected for a period greater than a set threshold wherein the set threshold can be any number of seconds or minutes (e.g., 1, 2, 3, 4, etc.). One skilled in the art would appreciate that such threshold is non-limiting. Robot 402 may be powered on again by a user providing an input to one or more buttons, switches, keyholes, etc., wherein the robot 402 may be initialized in either a manual mode or autonomous mode without limitation.

Still referring to FIG. 1, block 110 illustrates the controller 422 executing computer readable instructions stored in memory 424, shown in FIG. 4A, to re-enable the previously disabled units in block 104 and re-enter autonomous mode of operation.

After re-enabling all the autonomous features of robot 402, the controller 422 moves on to block 112. In this step, the controller 422 restores from memory unit 424 the current task that was introduced at block 104. The current task comprising the instructions stored in memory prior to entering manual mode and executing that instruction in block 104. Retrieving and executing the current task from memory may comprise of the robot 402, for example, completing a route or task partially executed prior to entering the manual mode. In other words, the controller 422 will retrieve the current task being executed by the robot 402 prior to entering the manual mode and continue with performing of that task.

According to at least one non-limiting exemplary embodiment, a robot 402 may continue to localize itself while operating in manual mode such that, upon exiting the manual mode, the robot 402 may localize itself such that the robot 402 may continue executing a current task. According to at least one non-limiting exemplary embodiment, a robot 402 may utilize a scan matching process upon exiting a manual mode such that the robot 402 may localize itself to continue executing a current task upon exiting the manual mode, wherein the localization is based at least in part on the robot 402 recognizing or detecting an object, using scan matching, via sensors 414 coupled to the robot 402, in order to localize the detected object on a computer readable map.

According to at least one non-limiting exemplary embodiment, a robot 402 may enter a manual mode upon executing steps of block 112 if a user input to a sensor configured to switch the robot 402 to the manual mode is detected. That is, during autonomous operation of the robot 402 a user input may be received to configure a controller 422 of the robot 402 to execute method 100 by executing computer readable instructions to enter the manual mode until the user re-enables autonomous mode.

Figure 2:
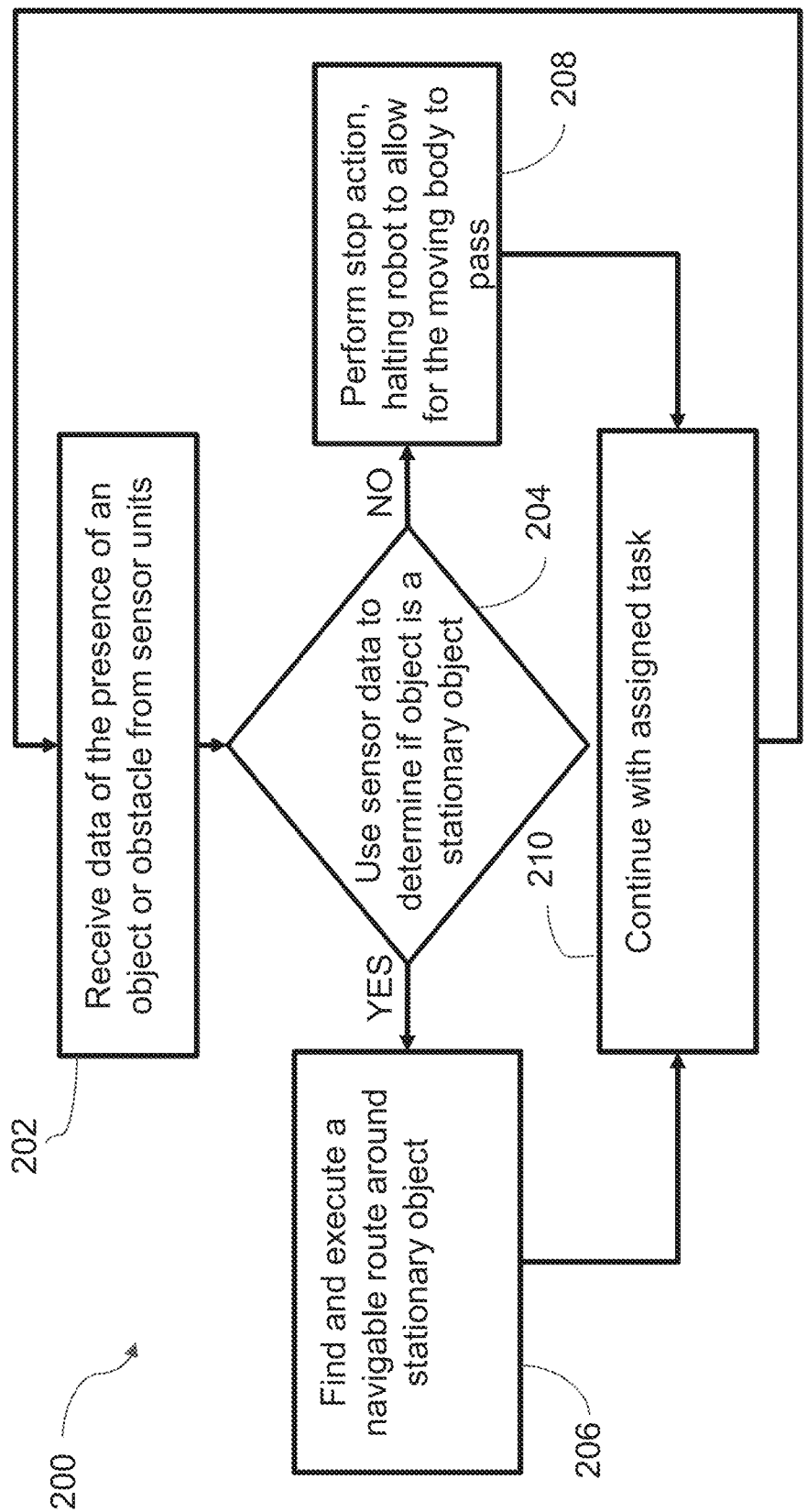
FIG. 2 is a process flow diagram of an exemplary method for the robotic tug to deal with stationary obstacles and moving bodies in accordance with some embodiments of this disclosure.

FIG. 2 illustrates a process flow diagram of method 200 for a robot 402 to detect, analyze, and navigate obstacles according to an exemplary embodiment.

Block 202 shown in FIG. 2 includes receiving data from sensor units 414, shown in FIG. 4A, of the presence of an obstacle impeding the motion of robot 402 or that is present in path of robot 402. Next, in block 204 after obstacle is detected, robot 402 utilizes sensor units 414, shown in FIG. 4A, to gather data from the obstacle such as, but not limited to, type of obstacle (stationary object, terrain, or moving body), speed, direction of motion (if applicable), and size of obstacle to determine if the obstacle is a moving body or stationary object.

Returning to FIG. 2, at block 204 if controller 422 determines that the object is a stationary object then the algorithm proceeds to block 206. Block 206 includes the controller 422 receiving and executing computer readable instructions to find and execute a navigable route around the stationary object. The computer readable instructions may configure robot 402 to determine a path around the stationary object based on data from sensor units 414, navigation units 406, mapping and localization units 426, and/or map evaluation units 428. A stationary object as used herein can include, any object in the path of robot 402 which is inanimate and/or stationary including, but not limited to, misplaced shopping carts, temporarily placed items, curbsides, people, and impassable terrain that can impede the motion of robot 402. A controller 422 of a robot 402 determining an executing a route 608 around a stationary object 606 is further illustrated below with respect to FIG. 6A-B.

Figure 7B:
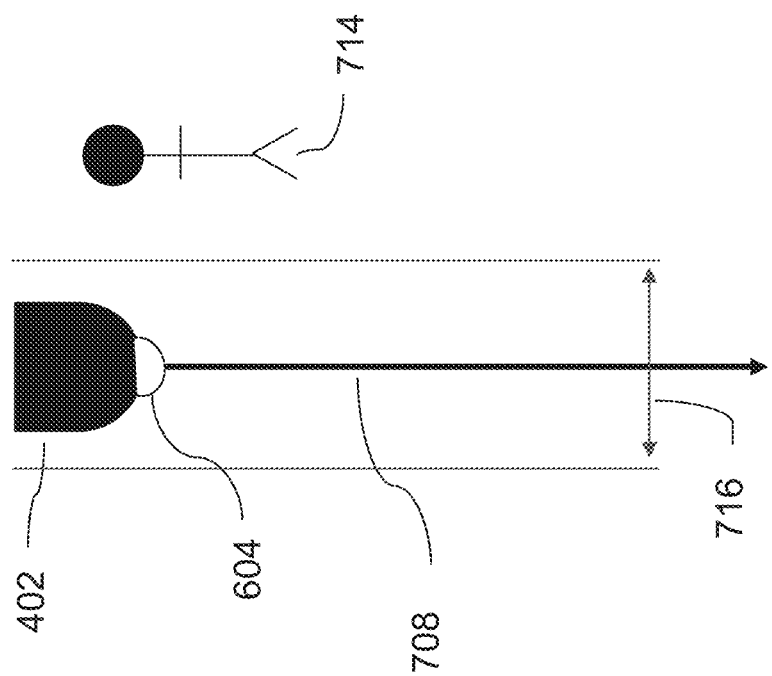
FIG. 7B is an overhead view of a robot halting allowing the moving body to pass.
Figure 7A:
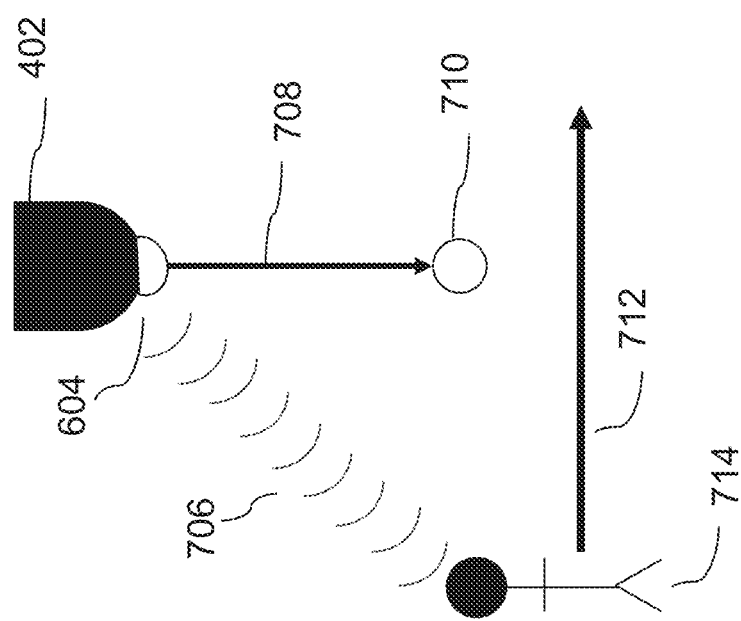
FIG. 7A is an overhead view of a robot detecting the presence and properties of a moving body crossing its path.

Returning to FIG. 2, at block 204 if controller 422 determines that the object is not a stationary object, then the algorithm proceeds to block 208. With reference to FIG. 4A, block 208 includes robot 402, utilizing sensor units 414, determining an obstacle is a moving body causing controller 422 to execute computer readable instructions to halt robot 402 to avoid collision with moving body 714 as shown in FIGS. 7A-B. A moving body 714 as used herein can include any object, person, and/or thing in the path of robot 402 which is in motion including, but not limited to, cars, pedestrians and/or other robots. In some exemplary embodiments, robot 402 utilizes sensors 414 to gather data on moving body 714 (e.g., speed, direction of motion, etc., of the moving body 714). In some exemplary embodiments, controller 422, shown in FIG. 4A, will execute computer readable instructions to determine the stopping distance 710 of robot 402 utilizing sensors 414 and ensure the stopping distance 710, shown in FIG. 7A, is far enough from the path of a moving body 714 in order to avoid collision. In some exemplary embodiments, while robot 402 is attached to load 506, shown in FIGS. 5A and 5B, stopping distance may vary (e.g., based on a weight of an attached load 506), wherein controller 422 may execute computer readable instructions to utilize data from one or more sensor units 414 ensuring robot 402 has ample stopping time and distance from the moving body 714. In some exemplary embodiments, controller 422, utilizing sensor units 414, will determine a moving body has passed once it has left a set distance threshold 716, shown in FIG. 7B. The set distance threshold 716 shown in FIG. 7B being a desired distance away from the robot 402 on the path traveled by the robot 402.

Returning to FIG. 2, block 210 includes controller 422 of robot 402 to execute computer readable instructions to continue performing tasks that it was doing prior to detecting an obstacle that is either a stationary body 606 or a moving body 714. In particular, the controller 422 continuously executes computer readable instructions to perform the algorithm illustrated in FIG. 2 as it navigates along a route.

Figure 5B:
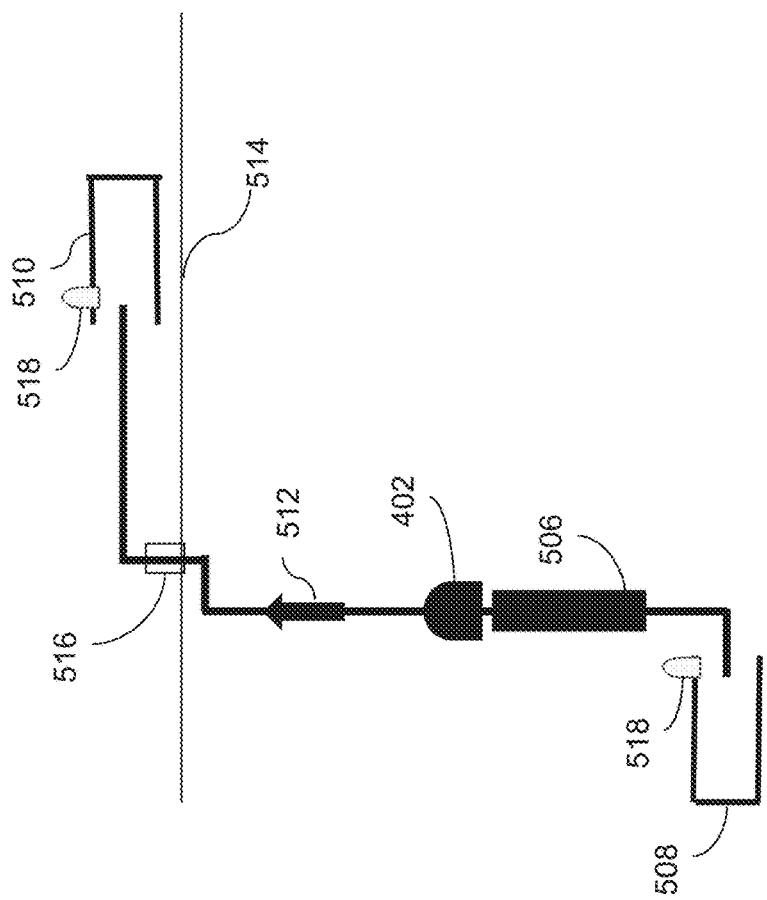
FIG. 5B is an overhead view of a robotic tug navigating to a drop-off location with an attached load.
Figure 5A:
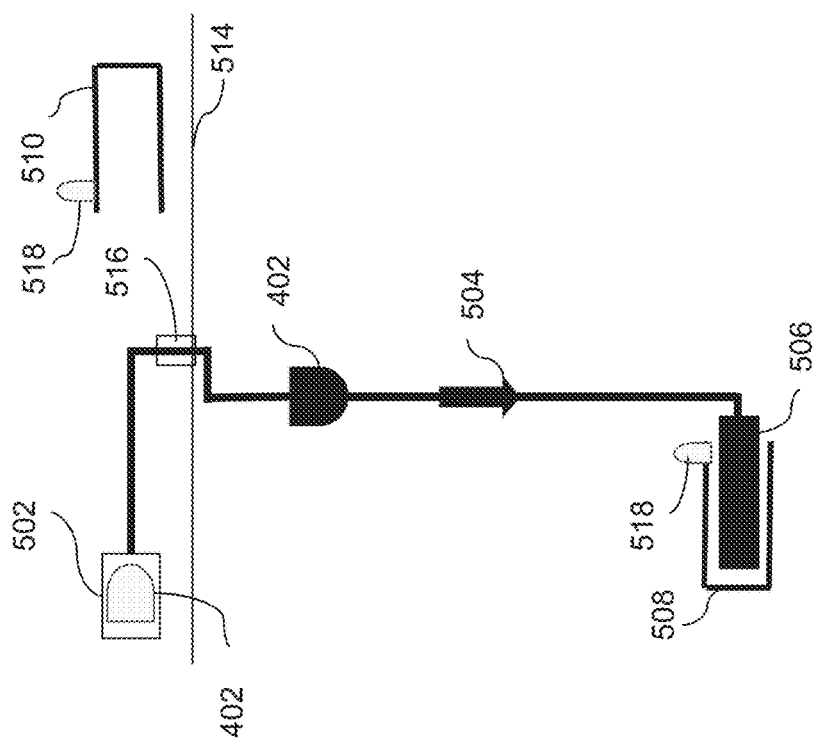
FIG. 5A is an overhead view of a robotic tug navigating to a load from an initialization location.

FIG. 3 illustrates a process flow diagram of an exemplary method 300 for robot 402 to navigate to and retrieve loads 506, shown in FIGS. 5A and 5B. It is appreciated that a robot 402 performing a task may comprise of a controller 422 of the robot 402 executing computer readable instructions from a non-transitory memory 424 to determine control signals to one or more operative units 404, illustrated in FIG. 4A below.

Block 302 includes robot 402 receiving input data from user interface units 412, and/or remotely (e.g., from a cloud, server, network, etc.), the input data comprising a location of loads 506 and drop-off locations 510 within an environment of the robot 402. In some exemplary embodiments, this input data comprises a computer readable map of the environment with loads 506 and drop-off locations 510 localized therein. In some exemplary embodiments, a navigable route may be learned by robot 402 by following or being driven by a human user through the route, wherein locations of loads 506 and drop-off locations 510 may be learned during training/learning of the route. Controller 422 stores this route and localization data in memory 424. In some exemplary embodiments, this input data comprises of location of load 506, location of drop-off locations 510, layout of terrain, and/or specific routes for the robot 402 inputted by a user 806. In some exemplary embodiments, this input data may be communicated to the robot 402 using a user interface, wireless communication, and/or wired communication.

Block 304 includes robot 402 navigating to a designated load location 510, shown in FIG. 5B, analyzing the load 506 utilizing one, some, or all of sensor units 414 as robot 402 approaches load 506. By way of a non-limiting exemplary embodiment, robot 402 may appropriately approach load 506 while utilizing one, some, or all of sensor units 414 and actuator units 408 to approach load 506 in the correct orientation, direction, and/or speed. In particular, the approach to load 506 being adjusted based on characteristics of the load 506 (i.e., small, short, tall, heavy, big, etc.) and the region surrounding the load 506 (i.e., tight or constrained space). As such, robot 402 may approach the load 506 slowly and more cautiously if the load 506 is positioned in a tight or constrained space as opposed to being placed in the open with little to minimal obstructions in the path of robot 402 to the load 506.

Still referring to FIG. 3, block 306 includes robot 402 utilizing actuator units 408 and data from one or more sensor units 414 to attach to the load 506. Attach to load, as used herein, may include any method of latching, connecting, lifting, or any similar action allowing robot 402 to transport load 506. In some exemplary embodiments, robot 402 uses sensor units 414 to determine where to latch onto, lift, or connect to load 506. In some exemplary embodiments, a latch may contain additional sensors of which robot 402 can utilize data from to ensure a proper attachment to the load 506. In some exemplary embodiments, robot 402 may utilize a latch module 1200 illustrated in FIG. 12A-C below to attach to loads 506.

Returning to FIG. 3, block 308 includes the robot 402 bringing the load 506 to a designated drop-off location 510. In some exemplary embodiments, robot 402 may utilize some or all of sensors 414 and navigation units 406, controlled by controller 422 executing computer readable instructions, to navigate the robot 402 to the drop-off location 510 to detach from the load 506. In some exemplary embodiments, a robot 402 must choose a drop-off locations 510, shown in FIGS. 5A and 5B, when multiple drop-off locations 510 are available based on, in part, data from sensor units 414 and/or navigation units 406.

According to at least one non-limiting exemplary embodiment, upon executing steps set forth in block 308, a robot 402 may return to a load location 508, visited during execution of steps set forth in block 304, to attach to and move additional loads 506 from the location 508 to one or more drop-off locations 510. For example, a robot 402 may require multiple trips to and from a load location 508 to move the entirety of a load 506. That is, the controller 422 of the robot 402 may return to block 304 upon executing steps of block 308.

According to at least one non-limiting exemplary embodiment, upon executing steps set forth in block 308, a robot 402 may await further instructions from a user. The instructions may comprise of a location of another, different load 506 and drop-off location 510. That is, a controller 422 of the robot 402 may repeat method 300 upon bringing a load to a drop-off location 510. Alternatively, the robot 402 may return to, for example, a home base or designated location to await the further instructions from the user.

According to at least one non-limiting exemplary embodiment, a user input at block 302 may comprise of a sequence of loads 506 to be moved to a respective sequence of drop-off locations 510. A controller 422 of a robot 402 may execute steps set forth in blocks 304-308 at least once until the sequence of loads 506 have been move to their respective drop-off locations 510, wherein the controller 422 may return to block 302 upon moving all the loads 506 to await further instructions from the user.

Next referring to FIG. 4A, a functional block diagram of a robot 402 is illustrated in accordance with some exemplary embodiments of this disclosure. As illustrated in FIG. 4A, robot 402 includes operative units 404, controller 422, memory 424, and power supply 420, each of which can be operatively and/or communicatively coupled to each other and each other's components and/or subcomponents. Controller 422 controls the various operations performed by robot 402. Although a specific implementation is illustrated in FIG. 4A, it is appreciated that the architecture may be varied in certain embodiments as would be readily apparent to one of ordinary skill in the art given the contents of the present disclosure.

Controller 422 can control the various operations performed by robot 402. Controller 422 can include or comprise one or more processors (e.g., microprocessors) and other peripherals. As used herein, processor, microprocessor, and/or digital processor can include any type of digital processing device such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, specialized processors (e.g., neuromorphic processors), and application-specific integrated circuits ("ASICs"). Such digital processors can be contained on a single unitary integrated circuit die or distributed across multiple components.

Controller 422 can be operatively and/or communicatively coupled to memory 424. Memory 424 can include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 424 can provide instructions and data to controller 422. For example, memory 424 can be a non-transitory, computer readable storage apparatus and/or medium having a plurality of instructions stored thereon, the instructions being executable by a processing apparatus (e.g., controller 422) to operate robot 402. In some exemplary embodiments, the instructions can be configured to, when executed by the processing apparatus, cause the processing apparatus to perform the various methods, features, and/or functionality described in this disclosure. Accordingly, controller 422 can perform logical and/or arithmetic operations based on program instructions stored within memory 424. In some exemplary embodiments, the instructions and/or data of memory 424 can be stored in a combination of hardware, some located locally within robot 402, and some located remote from robot 402 (e.g., in a cloud, server, network, etc.).

In some exemplary embodiments, memory 424, shown in FIG. 4A, can store a library of sensor data. In some exemplary embodiments, the sensor data can be associated at least in part with objects and/or people. In exemplary embodiments, this library can include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library can be taken by a sensor (e.g., a sensor of sensors unit 414 or any other sensor) and/or generated automatically, such as with a computer program that is configured to generate/simulate (e.g., in a virtual world) library sensor data (e.g., which can generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library can depend at least in part on one or more of the amount of available data, the variability of the surrounding environment in which robot 402 operates, the complexity of objects and/or people, the variability in appearance of objects, physical properties of robots, the characteristics of the sensors, and/or the amount of available storage space (e.g., in the library, memory 424, and/or local or remote storage). In exemplary embodiments, at least a portion of the library may be stored on a network (e.g., cloud, server, distributed network, etc.) and/or may not be stored completely within memory 424. As yet another exemplary embodiment, various robots (e.g., that are commonly associated, such as robots by a common manufacturer, user, network, etc.) can be networked so that data captured by individual robots are collectively shared with other robots. In such a fashion, these robots can be configured to learn and/or share sensor data in order to facilitate the ability to readily detect and/or identify errors and/or assist events.

Still referring to FIG. 4A, operative units 404 can be coupled to controller 422, or any other controller, to perform the various operations described in this disclosure. One, more, or none of the modules in operative units 404 can be included in some embodiments. Throughout this disclosure, reference may be to various controllers and/or processors. In some embodiments, a single controller (e.g., controller 422) can serve as the various controllers and/or processors described. In other embodiments different controllers and/or processors can be used, such as controllers and/or processors used particularly for one or more operative units 404. Controller 422 can send and/or receive signals, such as power signals, status signals, data signals, electrical signals, and/or any other desirable signals, including discrete and analog signals to operative units 404. Controller 422 can coordinate and/or manage operative units 404, and/or set timings (e.g., synchronously or asynchronously), turn off/on control power budgets, receive/send network instructions and/or updates, update firmware, send interrogatory signals, receive and/or send statuses, and/or perform any operations for running features of robot 402.

Returning to FIG. 4A, operative units 404 can include various units that perform functions for robot 402. For example, operative units 404 includes at least navigation units 406, actuator units 408, user interface units 412, sensor units 414, and communication units 416. Operative units 404 can also comprise other units that provide the various functionality of robot 402. In exemplary embodiments, operative units 404 can be instantiated in software, hardware, or both software and hardware. For example, in some exemplary embodiments, units of operative unit 404 can comprise computer implemented instructions executed by a controller. In exemplary embodiments, units of operative unit 404 can comprise hardcoded logic. In exemplary embodiments, units of operative units 402 can comprise both computer-implemented instructions executed by a controller and hardcoded logic. Where operative units 404 are implemented in part in software, operative units 404 can include units/modules of code configured to provide one or more functionalities.

In exemplary embodiments, navigation units 406 can include systems and methods that can computationally construct and update a map of environment 500, localize robot 402 (e.g., find the position) in a map, and navigate robot 402 to/from load location 510. The mapping can be performed by imposing data obtained in part by sensor units 414 into a computer readable map representative at least in part of the environment 500. In exemplary embodiments, a map of environment 500 may be uploaded to robot 402 through user interface units 412, uploaded wirelessly or through wired connection, or taught to robot 402 by user 806.

In exemplary embodiments, navigation units 406 can further comprise a mapping and localization unit 426 which can receive sensor data from sensors units 414 to localize robot 402 in a map. In exemplary embodiments, mapping and localization units can include localization systems and methods that allow robot 402 to localize itself in the coordinates of a map and/or relative to a location (e.g., an initialization location, end location, beacon, reference point, etc.). Mapping and localization units can also process measurements taken by robot 402, such as by generating a graph and/or map. In some embodiments, mapping and localization unit 426 may not be a separate unit, but rather a portion of sensors unit 414 and/or controller 422.

In some embodiments, navigation units 406 can further comprise a map evaluation unit 428 which can analyze and evaluate a map or route to detect errors (e.g., map errors, map resolution, discontinuous routes, etc.), and/or the usability of a map or route. In exemplary embodiments, navigation units 406 determine a map to be unusable and/or contain errors causing robot 402 to prompt user 806 to re-demonstrate a route, or otherwise re-map the environment 500.

In exemplary embodiments, navigation units 406 can include components and/or software configured to provide directional instructions for robot 402 to navigate. Navigation units 406 can process maps, routes, and localization information generated by mapping and localization units, data from sensor units 414, and/or other operative units 404.

In exemplary embodiments, robot 402 can map and learn routes through a learning process. For example, an operator can teach robot 402 where to travel in an environment by driving robot 402 along a route in an environment. Through a combination of sensor data from sensor units 414, robot 402 can determine robot's 402 relative poses and the poses of items in the environment. In this way, robot 402 can determine where it is in an environment and where it has travelled. Robot 402 can later recall where it travelled and travel in a substantially similar way (though it may avoid certain obstacles in subsequent travels). In some embodiments, robots can share such experiences with each other wirelessly, utilizing communication units 416.

Still referring to FIG. 4A, actuator units 408 can include actuators such as electric motors, gas motors, driven magnet systems, solenoid/ratchet systems, piezoelectric systems (e.g., inchworm motors), magneto strictive elements, gesticulation, and/or any way of driving an actuator known in the art. By way of illustration, such actuators can actuate the wheels for robot 402 to navigate a route; navigate around obstacles; rotate cameras and sensors; and/or attach to or lift load 506. In exemplary embodiments, actuator units 408 can include actuators configured for actions and/or action-specific tasks such as lifting load 506, steering, enabling/disabling latch 1200 of FIG. 12, controlling a lift bed 910 of FIG. 9B, turning a camera and/or any sensor of sensor units 414, and/or any movement desired for robot 402 to perform an action.

Still referring to FIG. 4A, sensor units 414 can comprise systems that can detect characteristics within and/or around robot 402. Sensor units 414 can include sensors that are internal to robot 402 or external, and/or have components that are partially internal and/or partially external. Sensor units 414 can include exteroceptive sensors such as sonar, LiDAR, radar, lasers, video cameras, infrared cameras, 3D sensors, 3D cameras, and/or any other sensor known in the art. Sensor units 414 can also include proprioceptive sensors, such as accelerometers, internal measurement units, odometers, gyroscopes, speedometers, and the like. In some exemplary embodiments, sensors unit 414 can include one or more exteroceptive sensors, such as sonars, light detection and ranging ("LIDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. In exemplary embodiments, sensor units 414 can collect raw measurements (e.g., currents, voltages, resistances, gate logic, etc.) and/or transformed measurements (e.g., distance, angles, detected points in obstacles, etc.). Such data can be stored in data structures, such as matrices, arrays, queues, lists, arrays, stacks, bags, etc.

In exemplary embodiments, sensors unit 414 can include sensors that can measure internal characteristics of robot 402. For example, sensors unit 414 can measure temperature, power levels, statuses, and/or any characteristic of robot 402. In exemplary embodiments, sensors unit 414 can be configured to determine the odometry of robot 402. For example, sensors unit 414 can include proprioceptive sensors, which can comprise sensors such as accelerometers, inertial measurement units ("IMU"), odometers, gyroscopes, speedometers, cameras (e.g. using visual odometry), clock/timer, and the like. Odometry can facilitate autonomous navigation and/or autonomous actions of robot 402. This odometry can include position of the robot 402 (e.g., where position can include robot's location, displacement and/or orientation, and can sometimes be interchangeable with the term pose as used herein) relative to the initial location. Such data can be stored in data structures, such as matrices, arrays, queues, lists, arrays, stacks, bags, etc.

In exemplary embodiments, user interface unit 412 can be configured to enable a user to interact with robot 402. For example, user interface unit 412 can include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer readable medium), mice, rollerballs, consoles, vibrators, audio transducers, and/or any interface for a user to input and/or receive data and/or commands, whether coupled wirelessly or through wires. User interface units 412 can include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. In exemplary embodiments user interface unit 412 can be positioned on the armature of robot 402. In exemplary embodiments, user interface unit 412 can be positioned away from the body of robot 402 but can be communicatively coupled to robot 402 (e.g., via communication units including transmitters, receivers, and/or transceivers) directly or indirectly (e.g., through a network, server, and/or a cloud). In exemplary embodiments, user interface unit 412 can include one or more projections of images on a surface (e.g., the floor) proximally located to the robot, e.g., to provide information to the operator or to people around the robot. The information could be the direction of future movement of the robot, such as an indication of moving forward, left, right, back, at an angle, and/or any other direction. In some exemplary embodiments, such information can utilize arrows, colors, symbols, etc.

In exemplary embodiments, communications unit 416 can include one or more receivers, transmitters, and/or transceivers. Communications unit 416 can be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communication units 416, shown in FIG. 4A, can also be configured to send/receive a transmission protocol over a wired connection such as any cable that has a signal line and ground. For example, such cables can include Ethernet cables, coaxial cables, Universal Serial Bus ("USB"), Fire Wire, and/or any connection known in the art. Such protocols can be used by communication units 416 to communicate to external systems such as computers, other robots, smart phones, tablets, data capture systems, mobile telecommunications networks, clouds, servers, or the like. Communication units 416 can be configured to send and receive signals comprising of numbers, letters, alphanumeric characters, and/or symbols. In exemplary embodiments, signals can be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communication units 416 can be configured to send and receive statuses, commands, and other data/information. By means of exemplary embodiments, communication units 416 can communicate with a user through wire or wirelessly to implement new routes/maps for robot 402 to navigate. Communications units 416 can communicate with a server/network to allow robot 402 to send data, statuses, commands, and other communications to the server. The server can be communicatively coupled to computer(s) and/or device(s) that can be used to monitor and/or control robot 402 remotely. Communication units 416 can also receive updates (e.g., firmware or data updates), data, statuses, commands, and other communications from a server for robot 402 and/or its operative units 404.

It should be readily apparent to one of ordinary skill in the art that a processor can be external to robot 402 and be communicatively coupled to controller 422 of robot 402 utilizing communications units 416 wherein the external processor can receive data from robot 402, process the data, and transmit computer readable instructions back to controller 422. In at least one non-limiting exemplary embodiment, the processor can be on a remote server (not shown).

In exemplary embodiments, there can be a plurality of robots acting in coordination. For example, some environments (e.g., shopping malls, hospitals, retirement communities, airports, office buildings, city centers, schools, and/or other public or private places) can have a plurality of people and/or robots in a space. In some exemplary embodiments, for example, the plurality of robots can be coordinated and/or connected to one or more networks. For example, the networks can manage the locations of one or more of robot 402 and/or other robots. In exemplary embodiments, the network can act as traffic control, controlling the locational density, trajectories, avoidance of collisions, flow, and/or other characteristics of the aggregated set of robots to which the network is in communication. For example, the network can assist the robots in travelling in an ordered manner, assure that the robots travel in optimal routes, that robots distribute themselves in locations where they can quickly/effective serve passengers (e.g., can arrive at pick-up places quickly), behave safely, avoid collisions, move out of the way of emergency vehicles, and/or other macro-level and/or micro-level management.

In order to aide such coordination, a plurality of robots can be communicatively coupled to one another. For example, using communications unit 416, robot 402 can send signals to one or more other robots indicating one or more of robot 402's location, speed, acceleration, stopping/braking, status (e.g., on, off, good status, bad status, failures, errors, need assistance), destination, etc. In one implementation, the robots communicate through a common hub, e.g., in the cloud. In some exemplary embodiments, robots can communicate with each other, and/or use each other as relays for information, in the event that the network is not fully functional. For example, robots can communicate via a distributive network, mobile ad hoc network ("MANET"), and/or any connective network. Any communication and/or signal described in this disclosure can then be transmitted through such network.

In exemplary embodiments, operating system 410 can be configured to manage memory 424, controller 422, power supply 420, modules in operative units 404, and/or any software, hardware, and/or features of robot 402. For example, and without limitation, operating system 410 can include device drivers to manage hardware recourses for robot 402.

In exemplary embodiments, power supply 420 can include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries can be rechargeable, such as wirelessly (e.g., by resonant circuit and/or a resonant tank circuit) and/or plugging into an external power source. Power supply 420 can also be any supplier of energy, including wall sockets and electronic devices that convert solar, wind, water, nuclear, hydrogen, gasoline, natural gas, fossil fuels, mechanical energy, steam, and/or any power source into electricity.

As previously mentioned, any of the components of robot 402 can be instantiated in software and/or hardware. For example, a unit/module can be a piece of hardware and/or a piece of code run on a computer.

Figure 4B:
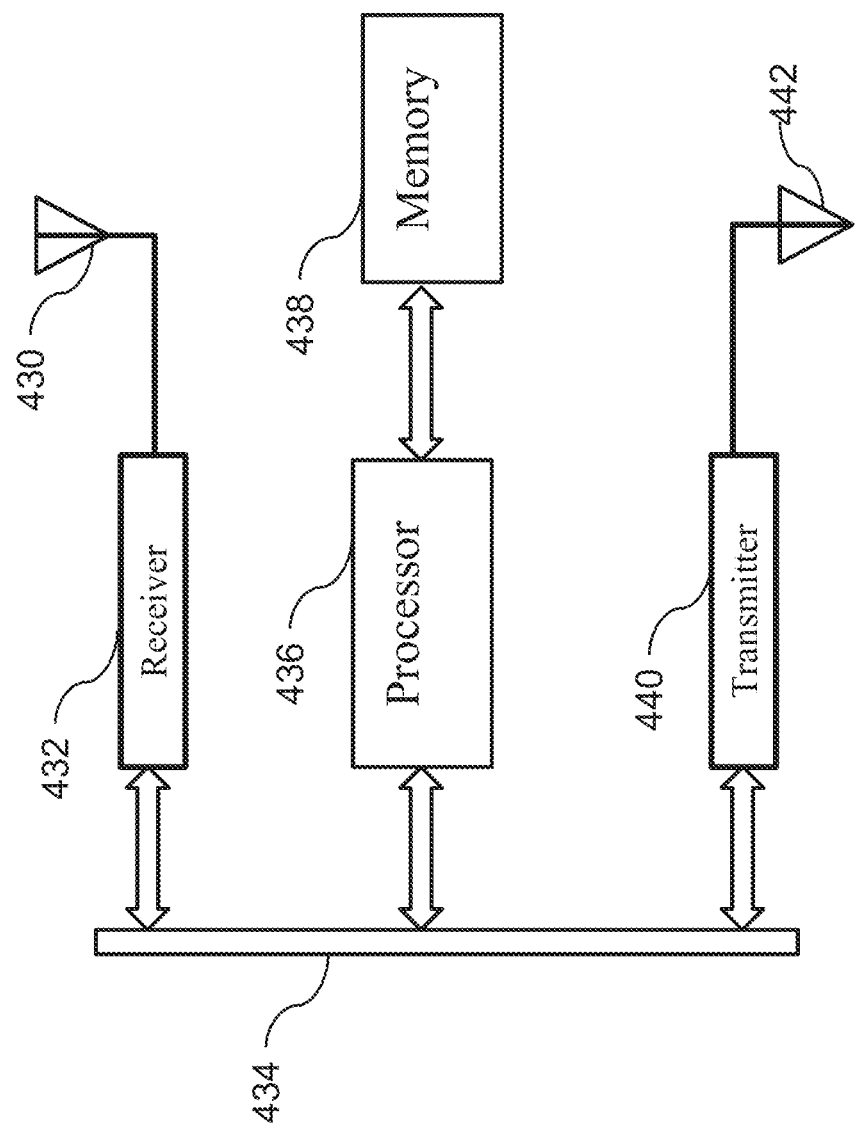
FIG. 4B illustrates architecture of the controller used in the system shown in FIG. 4A.

Next referring to FIG. 4B, the architecture of the specialized controller 422 used in the system shown in FIG. 4A is illustrated according to an exemplary embodiment. As illustrated in FIG. 4B, the specialized computer includes a data bus 434, a receiver 432, a transmitter 440, at least one processor 436, and a memory 438. The receiver 432, the processor 436 and the transmitter 440 all communicate with each other via the data bus 434. The processor 436 is a specialized processor configured to execute specialized algorithms. The processor 436 is configured to access the memory 438, which stores computer code or instructions in order for the processor 436 to execute the specialized algorithms. As illustrated in FIG. 4B, memory 438 may comprise of some, none, different, or all of the features of memory 424 previously illustrated in FIG. 4A. The algorithms executed by the processor 436 are discussed in further detail below. The receiver 432 as shown in FIG. 4B is configured to receive input signals 430. The input signals 430 may comprise of signals from a plurality of operative units 404 illustrated in FIG. 4A including, but not limited to, sensor data from sensor units 414, user inputs, motor feedback, external communication signals (e.g., from a remote server), and/or any other signal from an operative unit 404 requiring further processing by the specialized controller 422. The receiver 432 communicates these received signals to the processor 436 via the data bus 434. As one skilled in the art would appreciate, the data bus 434 is the means of communication between the different components—receiver, processor, and transmitter—in the specialized controller 448422. The processor 436 executes the algorithms, as discussed below, by accessing specialized computer readable instructions from the memory 438. Further detailed description as to the processor 436 executing the specialized algorithms in receiving, processing and transmitting of these signals is discussed above with respect to FIG. 4A. The memory 438 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 436 may communicate output signals to transmitter 440 via data bus 434 as illustrated. The transmitter 440 may be configured to further communicate the output signals to a plurality of operative units 404 illustrated by signal output 442.

One of ordinary skill in the art would appreciate that the architecture illustrated in FIG. 4B may illustrate an external server architecture configured to effectuate the control of a robotic apparatus from a remote location. That is, the server may also include a data bus, a receiver, a transmitter, a processor, and a memory that stores specialized computer readable instructions thereon.

FIG. 5A illustrates a route 504 a robot 402 traverses to load location 508, according to an exemplary embodiment. Route 504 may contain one, none, or many obstacles including, without limitation, a stationary object 606, shown in FIG. 6A; a moving body 714, shown in FIG. 7A; and/or a user 806 giving input to a plurality of switches 802A, 802B shown in FIGS. 8A, 8B, disabling autonomous operation of the robot 402. By way of illustrative exemplary embodiment, load 506, shown in FIGS. 5A and 5B, may be stacked shopping carts in a parking lot, or a designated parcel or item that needs to be retrieved, wherein a robot 402 may utilize navigation units 406 and sensor units 414 to navigate the parking lot along route 504 to load location 508 while avoiding obstacles (e.g., people, cars, other robots, etc.).

In exemplary embodiments, the location of load 506, drop-off location 510, and known obstacles is uploaded to robot 402 through user interface, wireless upload, and/or wired connection in the form of a digital computer readable map of the environment. In another exemplary embodiment, marker 518 emit a wireless signal which communicate with a robot 402 are placed on load location 508 and drop-off location 510 to guide robot 402 during navigation to/from the load location 508. Stated differently, the markers 518 placed on or coupled to the load location 508 and the drop-off location 510 represent as beacons that emit or transmit signals to robot 402 as it travels to and from the load and drop-off locations 508, 510.

In exemplary embodiments, marker 518, shown in FIGS. 5A and 5B, can make a sound, such as a chirp, beep, noise, and/or any other sound (whether audible or inaudible to humans, animals, and/or other listeners). In exemplary embodiments, the sound can be unique to the marker 518, wherein other markers can make other sounds. The sounds can be detected by a sensor of sensors unit 414 (e.g., by a microphone), which can use the sound to identify and/or triangulate the location of marker 518. In exemplary embodiments, marker 518 can include both human visible and invisible elements. Advantageously, having both human visible and invisible elements can facilitate a user directing robot 402 to detect marker 518. In some exemplary embodiments, the visible portion can be smaller and/or more inconspicuous than the invisible portion.

In exemplary embodiments, marker 518 may transmit a signal, such as a radio transmission (e.g., BLUETOOTH®), detectable light signal (e.g., green visible lights), and/or other signaling protocol, to enable detection of marker 518 by robot 402. In exemplary embodiments, there may be a transmitter (e.g., a transmitter that transmits communications using RFID, NFC, BLUETOOTH®, radio transmission, radio frequency field, and/or any other communication protocol described in this disclosure) at, or substantially close to, the pick-up location. Such communications may also transmit information about the load location 506 and drop-off location 510 such as, for example, its passengers, coordinates, and/or identification (e.g., shopping carts, shipping pallets, etc.). When robot 402 detects that it is substantially close to a marker 518 (e.g., by detecting the marker 518 within a specified distance from the robot 402), the robot 402 may determine that the robot 402 is at the load location 508 or drop-off location 510, respectively. One skilled in the art would appreciate that signal transmitted by marker 518 at load location 508 may be different from signal transmitted by marker 518 at drop-off location 510, which assists robot 402 in determining whether it is at load location 508 or drop-off location 510.

In exemplary embodiments, the marker 518 can have an operable range such that robot 402 may detect and localize the marker 518 when it is sufficiently close to the marker 518. By way of an exemplary embodiment, a transmission range of a near field communication (NFC) marker 518 may be ten (10) centimeters or less. Accordingly, when robot 402 receives a transmission via NFC marker 518, the robot 402 may detect that it is positioned at load location 506 or drop-off location 510. In exemplary embodiments, robot 402 may receive the transmission from the marker 518 and calculate the distance to the marker 518 based at on, for example, the attenuation of signal strength from the marker 518 or a time of flight (ToF) of a signal between the marker 518 and robot 402. In this way, robot 402 may detect how close it is to the transmitter and, consequently, the position of robot 402 relative to the transmitter and/or the pick-up location 508. In exemplary embodiments, robot 402 may determine its location by triangulating the signal strength of a plurality of transmitters. In exemplary embodiments, the pick-up location can be demarcated by a sign (e.g., markings, symbols, lines, etc.) on the floor. When one or more sensors coupled to robot 402 (e.g., of sensor units 414) detect the sign on the floor, robot 402 can detect that robot 402 is positioned at the load location 506 or drop-off location 510.

In exemplary embodiments, multiple load locations 508 may exist within an environment, wherein robot 402 may autonomously decide which location 508 to travel to based in part on data from navigation units 406 and sensor units 414 (e.g., distance to load location 508, known obstacles, terrain, etc.). Robot 402 can start at an initialization location 502 and navigate to a chosen load location 508. In exemplary embodiments, initialization location 502 may be a substantial distance from load location 508, wherein the robot 402 may utilize navigation units 406, localization and mapping 426 units, and sensor units 414 to create path 504.

Next referring to FIG. 5B a return route 512 of a robot 402, comprising a load 506 attached thereto, to a drop-off location 510 is illustrated, according to an exemplary embodiment. Route 512 can contain one, none, or many obstacles including stationary object 606, moving body 712, difficult terrain, and/or may be disabled by user 806 giving input to a plurality of switches 802A or 802B, shown in FIGS. 8A and 8B, to disable autonomous operation. The plurality of switches 802A, 802B may be configured to switch the robot 402 between manual and autonomous mode.

In exemplary embodiments, multiple drop-off locations 510 may exist within an environment for a robot 402 to drop-off load 506 within, wherein the robot 402 may autonomously decide which drop-off location to travel to, based in part on data from navigation units 406 and sensor units 414.

In some exemplary embodiments, some, none, or all of the contents of load 506 can be equally or otherwise distributed across a plurality of drop-off locations 510. Similarly, in some exemplary embodiments, a robot 402 may attach to multiple loads 506 from multiple load locations 508, each comprising a same or different load 506.

By means of exemplary embodiment, obstacle 514 may be a curbside or impassable terrain, wherein robot 402 must find or recall from memory 424 the location of a ramp 516 or another navigable path around obstacle 514 and modify route 504 accordingly. In exemplary embodiments, obstacle 514 may not be present. In exemplary embodiments, ramp 516 may also/alternatively be a lift designed for robot 402, people, or both. In exemplary embodiments, an obstacle 514 may comprise of a stationary object wherein ramp 516 may be illustrative of a viable path around the obstacle 514.

Figure 6B:
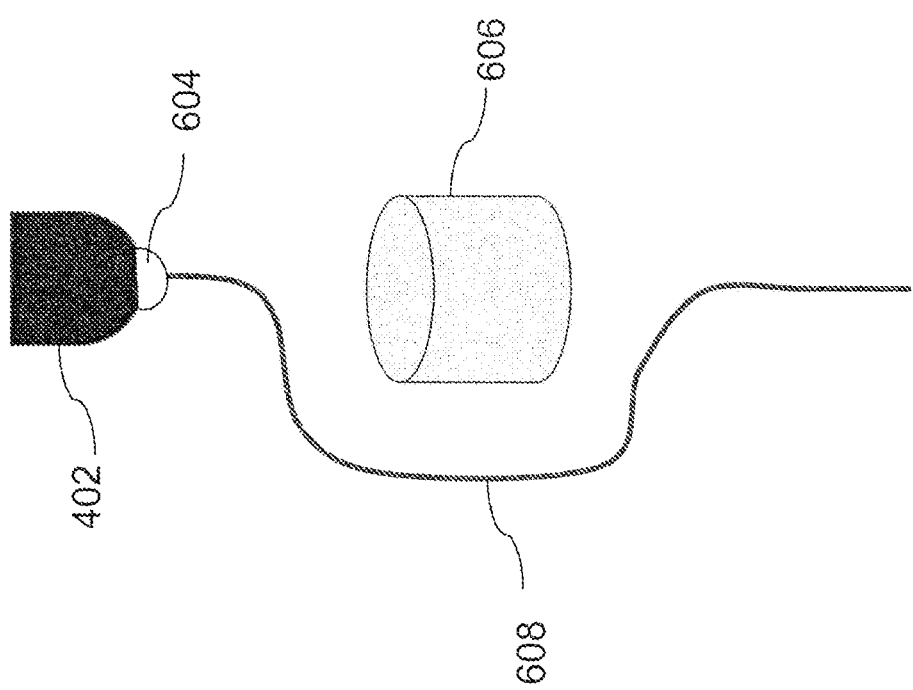
FIGS. 6A-6B are an overhead view of a robot encountering a stationary obstacle and navigating around it using the most optimal route.
Figure 6A:
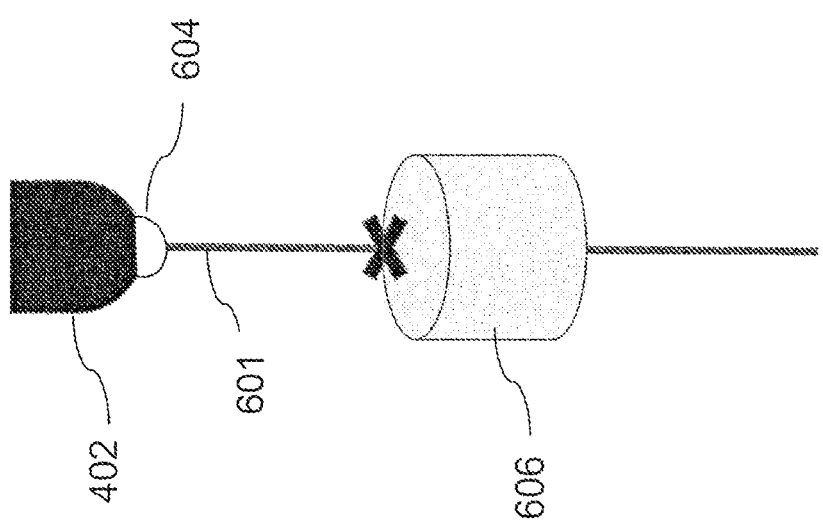

FIG. 6A illustrates robot 402 traversing an original path 602601, however, upon detecting a stationary object 606 along its path utilizing front facing sensor(s) 604 of sensor units 414, to determine that the path 602 cannot be pursued, according to an exemplary embodiment. In exemplary embodiments, controller 422 execute computer readable instructions to detect possible routes around stationary object 606 utilizing data gathered in part by sensor 604 and other operative units 404 (e.g., mapping and localization unit 426, map evaluation units 428, etc.).

FIG. 6B illustrates robot 402 determining a route 608 around the stationary object 606, according to an exemplary embodiment. Only one viable path may be available for the robot 402 in which case robot 402 will traverse this path around stationary object 606. In other exemplary embodiments, many paths around stationary object 606 are found causing robot 402 to choose the most optimal (e.g., shortest length), route 608. Route 608 can be determined in part by controller 422 execute computer readable instructions to utilize data gathered in part by navigation units 406, sensor 604 and/or other operative units 404 comprising of, but not limited to, length of route, terrain quality, additional obstacles, prior knowledge of environment, and/or distance to destination.

In exemplary embodiments, stationary object 606 may include one or more stationary objects including, but not limited to, parked cars, curbsides, trash and/or inanimate objects placed intentionally or otherwise along path 601 of robot 402. In exemplary embodiments, object 606 refers to an elevated curbside, sharp drop, or otherwise impassable terrain, wherein a robot 402 utilizes navigation units 406 and/or sensor units 414 to find a ramp/lift 516 or suitable path to navigate onto/off the curbside around impassable terrain.

FIG. 7A illustrates a robot 402 detecting a moving body 714 utilizing front facing sensor 604 illustrated in FIG. 6A-6B, according to an exemplary embodiment. Controller 422 may execute computer readable instructions to determine that a moving body 714, traveling path 712, will intersect the path 708 traveled by robot 402 and may collide with the robot 402. Such determination by controller 422 causes robot 402 to halt at point 710 along the path 708 but before potential intersection with the moving body 714. The point 710 being defined to be the maximum stopping distance of robot 402, and wait for moving body 714 to pass. In exemplary embodiments, controller 422 must ensure point 710 does not extend past the path 712 of moving body 714 to avoid collision with robot 402. In exemplary embodiments, controller 422 of robot 402 execute computer readable instructions to utilize incoming sensor data 706 to determine properties of moving body 714 including, but not limited to, direction of motion, speed, and/or distance from robot 402 to determine if robot 402 needs to halt to allow moving body 714 to pass.

In exemplary embodiments, controller 422 may execute computer readable instructions to determine that moving body 714 may be moving very quickly, be very distant from robot 402, and/or be moving at an angle such that robot 402 and moving body 714 will not collide. Upon such determination, the robot 402 can continue along route 708 without collision. In exemplary embodiments, controller 422 may simply slow down robot 402, using braking units (not shown) positioned on the wheels of robot 402, to allow a moving body 714 to pass before accelerating the robot 402 back to an original speed prior to the slow down.

FIG. 7B illustrates robot 402 waiting for moving body 714 to pass before resuming on its desired path 708, according to an exemplary embodiment. The robot 402 may wait for moving body to move a certain distance threshold 716, set by a user, away from the path 708 utilizing frontward facing sensor 604 before resuming along path 708.

In exemplary embodiments, a robot 402 may encounter one, none, or many moving bodies 714 while traversing path 708. In exemplary embodiments, moving body 714 may include multiple moving bodies requiring robot 402 to halt for multiple moving bodies 714 to pass. In exemplary embodiments, robot 402 may detect the presence of additional moving bodies in addition to moving body 714 requiring robot 402 to stay halted to allow for the additional moving bodies to pass.

In exemplary embodiments, a moving body 714 may be one, many, or a combination of any number of people walking/running, moving cars, inanimate objects moving into path 708, and/or animals.

Next, referring to FIG. 8A, a user interface 800 of a robot 402 is illustrated. The user interface 800 is manipulated or interacted by a user 806, which results in activating sensors 802A to enable/disable operation of the robot 402 in a manual mode, according to an exemplary embodiment. User interface 800 may further comprise handles 810, user interface device 804, and/or plurality of sensors 802A located atop armature 812. In some embodiments, sensor 802A may be one or multiple trigger switch(es), push button(s), leaver(s) or any other electromechanical switch(es) or trigger(s) with capabilities substantially similar to those described.

In some exemplary embodiments, user interface device 804 may be placed on armature 812 of robot 402 and may include some or all functionality of user interface units 412. In some exemplary embodiments, user interface device 804 may comprise of a touchscreen device. In some exemplary embodiments, a robot 402 may require input from one or multiple sensors 802A to enable/disable a manual mode. Switch 808 is an exemplary embodiment of a switch, button, key hole, sensor or input utilized by user 806 to power on or turn off robot 402 for reasons including emergency, convenience, and storage of robot 402.

In exemplary embodiments, armature 812 can contain some, none, or all operative units 404, power supply 420, controller 422, memory 424, locking mechanism 906, and/or front sensors 602. In some exemplary embodiments, the user interface 800 may be positioned on a portion of a robot body of a robot 402, wherein positioning the user interface 800 atop an armature 812 is not intended to be limiting.

FIG. 8B illustrates an exemplary implementation of a robot 402, wherein a user 806 utilizes sensors 802B to operate the robot 402 in a manual mode. In exemplary embodiments, the plurality of sensors 802B may utilize capacitive sensing, resistive sensing, pressure sensing, and/or any form of sensing user 806 is griping handles 810 without requiring the use of an electromechanical trigger and/or switch similar to sensor 802A illustrated in FIG. 8A above. One skilled in the art may appreciate a mechanical sensor 802A or a capacitive touch sensor 802B may be utilized to switch a tug robot 402 between a manual and autonomous modes of operation, wherein the two sensor types illustrated are not intended to be limiting.

In some embodiments, sensors 802A and 802B may be located elsewhere instead or in addition to handles 810. By way of illustrative exemplary embodiment, sensor 802A and/or 802B can be implemented on a backside of a robot 402 such that the robot 402 may be initialized to a manual mode from both a front and back sides.

In some embodiments, a sensor 802A or 802B may be installed or embedded additionally onto communication units 416 allowing user 806 to additionally utilize a wireless or wired signal to switch robot 402 into/out of manual mode.

In some embodiments, a sensor 802A or 802B may be positioned on handles 810 utilized for pulling or pushing the robot 402 during operation in a manual mode, the pushing or pulling configures motion of the robot 402 in the manual mode.

In some embodiments, a robot 402 may remain in a manual mode as long as a sensor 802A or 802B detects an input from a user (e.g., while the robot 402 is being pushed/pulled using the handles 810), wherein the robot 402 may, after a predetermined delay, enter an autonomous mode upon detecting no input from the user via sensors 802A or 802B.

In some embodiments, user interface 804 may receive a user input to switch the robot 402 between a manual mode and autonomous mode, wherein use of additional sensors 802A or 802B may not be necessary. Switches 802A may be mechanical switches and switches 802B may be capacitive contact sensors.

Figure 9A:
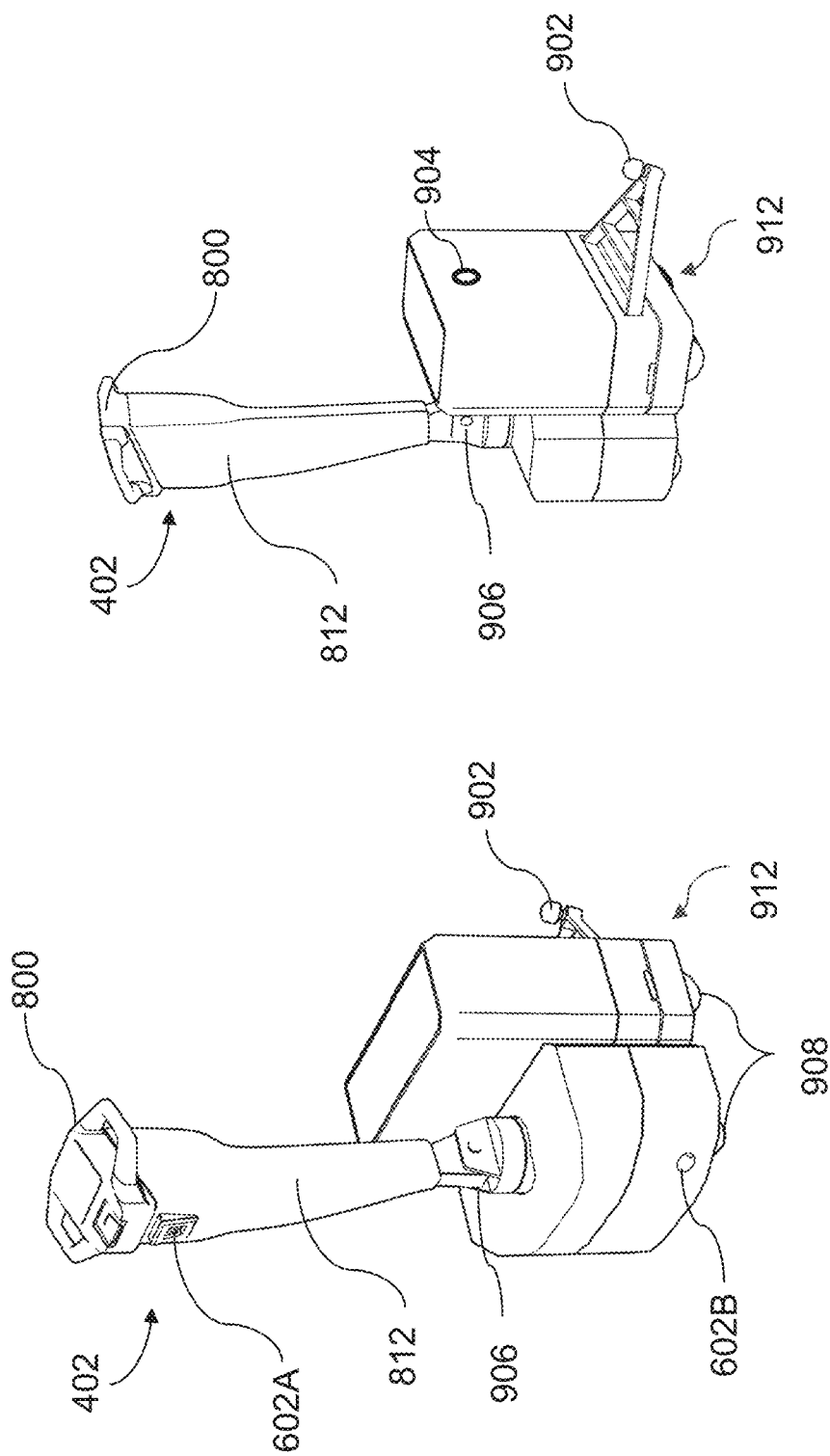
FIG. 9A is an exemplary embodiment of an implementation of a robotic tug being utilized as a cart tug illustrated in two perspective views.

FIG. 9A illustrates an exemplary implementation of a robot 402 as a tug. In exemplary embodiments, latch 902 may comprise of permanent magnets, electromagnets, hooks, mechanical latches, and/or any other similar device used for attaching load 506 to latch 902. In exemplary embodiments, rear sensor 904 may comprise of one or multiple sensors having some or all the functionality of sensor units 414. In exemplary embodiments, latch 902 can contain additional sensors with some, none, or all the functionality of sensing units 414. In some embodiments, latch 902 may be implemented using a latch module 1200 illustrated in FIG. 12A-C below. User interface 800 can comprise substantially similar features to those illustrated in FIG. 8A-8B.

In exemplary embodiments, wherein robot 402 is in autonomous mode, wheels 908 and braking units (not shown) may be operated by a controller 422 execute computer readable instructions to utilize actuator units 408. In exemplary embodiments, when a robot 402 is in manual mode, wheels 908 can be partially operated by controller 422 execute computer readable instructions to utilize actuator units 408 to provide additional utilities to user 806 including, but not limited to, power steering, traction control, lift assist, and/or any additional utility not purely used for autonomous operation; however, direction of motion may be effectuated by the user 806 pushing or pulling the robot 402 tug using handles 810 during manual operation. Additionally, in some exemplary embodiments, braking units (not shown) can be operated manually or disabled completely by the user while robot 402 is in manual mode.

Figure 9B:
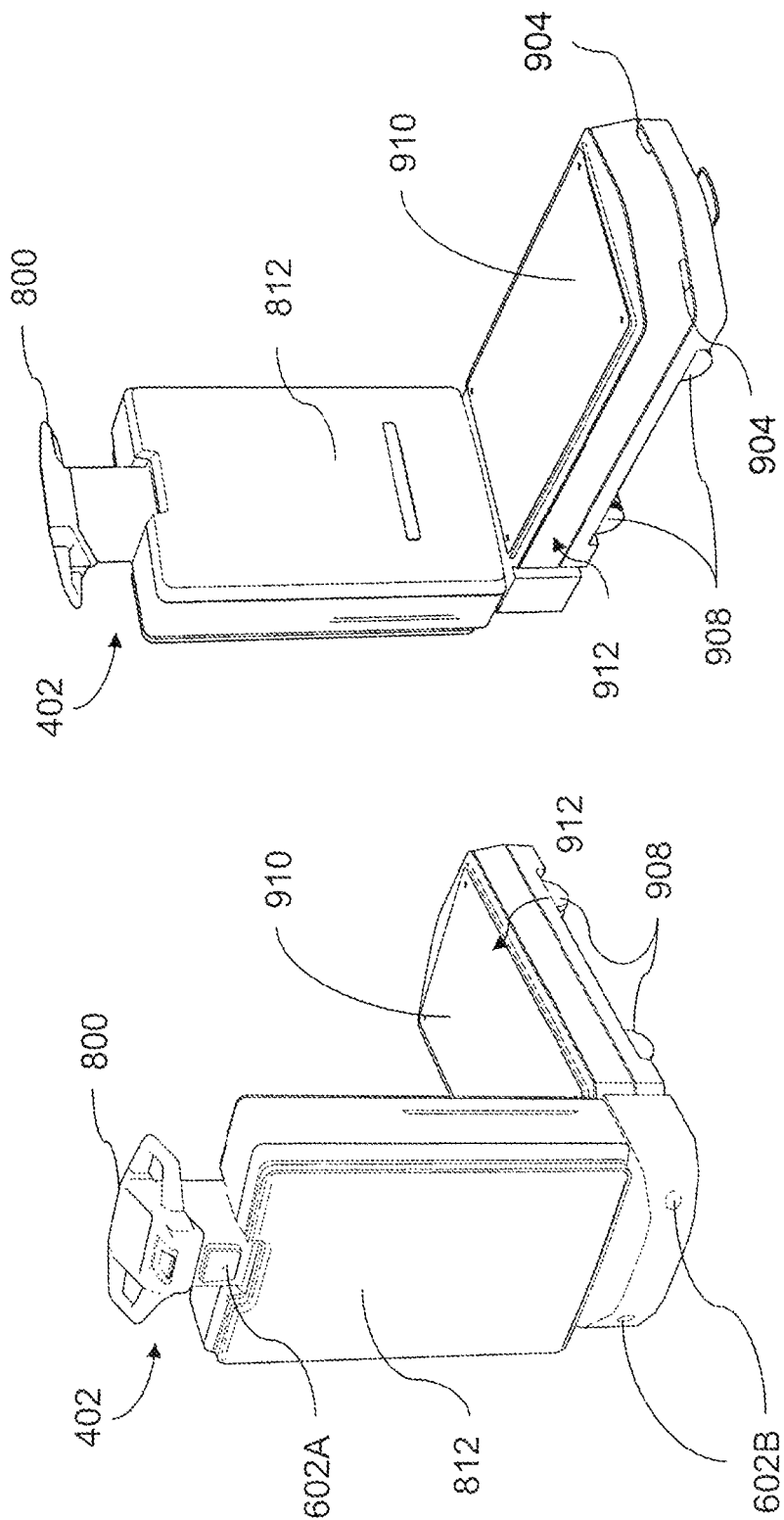
FIG. 9B is an exemplary embodiment of an implementation of a robotic tug being utilized as a dolly or flat platform truck illustrated in two perspective views.

In exemplary embodiments, frontward facing sensor 602 can be comprised of multiple frontward facing sensors 602A and/or 602B, shown in FIGS. 9A-9B. In exemplary embodiments, armature 812 may contain a locking mechanism 906 wherein armature 812 is locked upright in autonomous mode and rotatable, bendable, or otherwise moveable by user 806 in manual mode. In exemplary embodiments, locking mechanism 906 can be at the base of armature 812 and can be internal or external.

In exemplary embodiments, a robot 402 tug may further comprise an indication of the robot 402 operating in autonomous or manual mode. The indication may comprise, for example, one or more visible LEDs on the robot 402.

FIG. 9B illustrates an exemplary implementation of robot 402 from two perspective views as a dolly, push cart, hand truck, and/or caddy (i.e., another embodiment of a tug). In exemplary embodiments, lift bed 910 may be lowered under a load, autonomously or manually by user (e.g., user 806), and lift the load onto lift bed 910 from underneath. Robot 402 may use rear sensor 904, comprising of one or more sensors having some or all the functionality of sensor units 414, to approach and lift load 506 onto lift bed 910 while in autonomous mode. Ire exemplary embodiments, lift bed 910 may contain additional latches, magnets, and/or other similar instruments utilized to secure a load 506 onto lift bed 910. In exemplary embodiments, lift bed 910 is flat with respect to a flat floor beneath the robot 402. In other exemplary embodiments, lift bed 910 may be coupled to one or more actuator units 408 to configure tilting of the lift bed 910 for loading or unloading of loads 506. User interface 800 can comprise substantially similar features to those illustrated in FIGS. 8A-8B.

Still referring to FIG. 9A and FIG. 9B, robot 402 includes chassis 912 configured to support sensor(s) and/or other components of robot 402. The chassis may comprise of metal (e.g., steel, aluminum, tin, iron, and/or any construction metal), plastic (e.g., fiber-reinforced polymers, polyethylene terephthalate, high-density polyethylene, polyvinyl chloride, low density polyethylene, polypropylene, polystyrene, and/or any other plastic), polymers (e.g., polythene, polypropene, polyvinyl chloride, Teflon, polystyrene, bakelite, lexan, melamine, Perspex, vinyl rubber, neoprene, polystyrene-butadiene, and/or other polymers), ceramics (e.g., boron nitride, earthenware, porcelain, sialon, silicon carbide, steatite, titanium carbide, zirconia, and/or other ceramics), composites (e.g., cement, concrete, metal composites, ceramic composites, and/or other composites), organics (e.g., wood and/or other organics), and/or any other material.

Figure 10:
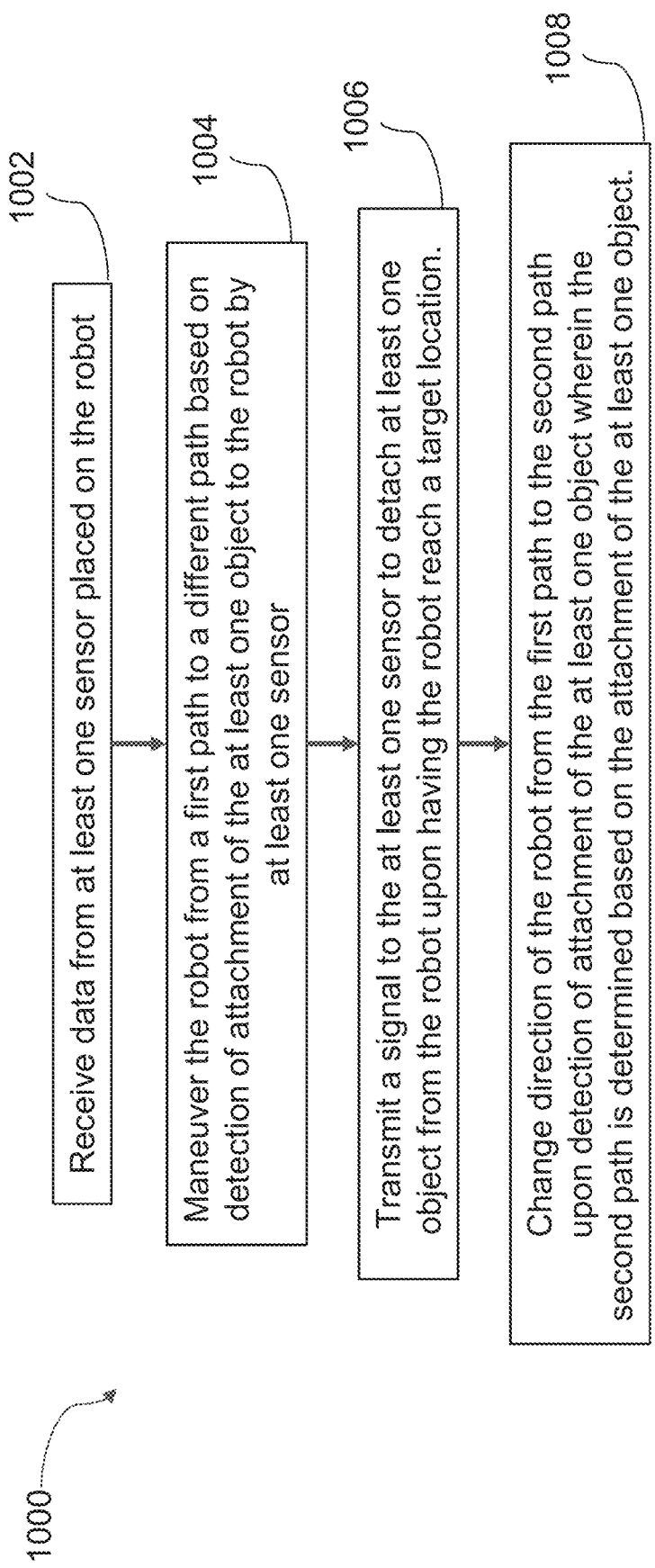
FIG. 10 is a process flow diagram of an exemplary method for operating a robotic tug.

FIG. 10 is an exemplary embodiment of the method 1000 in which controller 422 executes computer readable instructions while robot 402 is attaching a load 506 and transporting it to a load destination 510 as shown in FIG. 4A and FIGS. 5A-5B. Block 1002 includes controller 422 receiving data from at least one sensor of sensor units 414. According to one non-limiting exemplary embodiment, this sensor data can comprise the location of an obstacle, load drop-off location 510, and/or load pick-up locations 508.

Block 1004, with reference to FIG. 4A, includes controller 422 maneuvering the robot 402 from a first path to a different path based on the detection of load 506 being attached to robot 402. The load 506 being detected by sensor units 414. In one non-limiting exemplary embodiment, the second path can simply encompass the first path but in a reverse direction. In another non-limiting exemplary embodiment, the second path can be completely different from the first path.

Block 1006 includes controller 422 executing computer readable instructions to transmit a signal to at least one sensor to detach at least one object from robot 402 upon having robot 402 reach drop-off location 510.

Block 1008 includes controller 422 executing computer readable instructions to change the direction of robot 402 from the first path to the second path upon detection of attachment of the at least one object by one or a plurality of sensor units 414. Wherein, the second path is determined based on the attachment of the at least one object.

Figure 11:
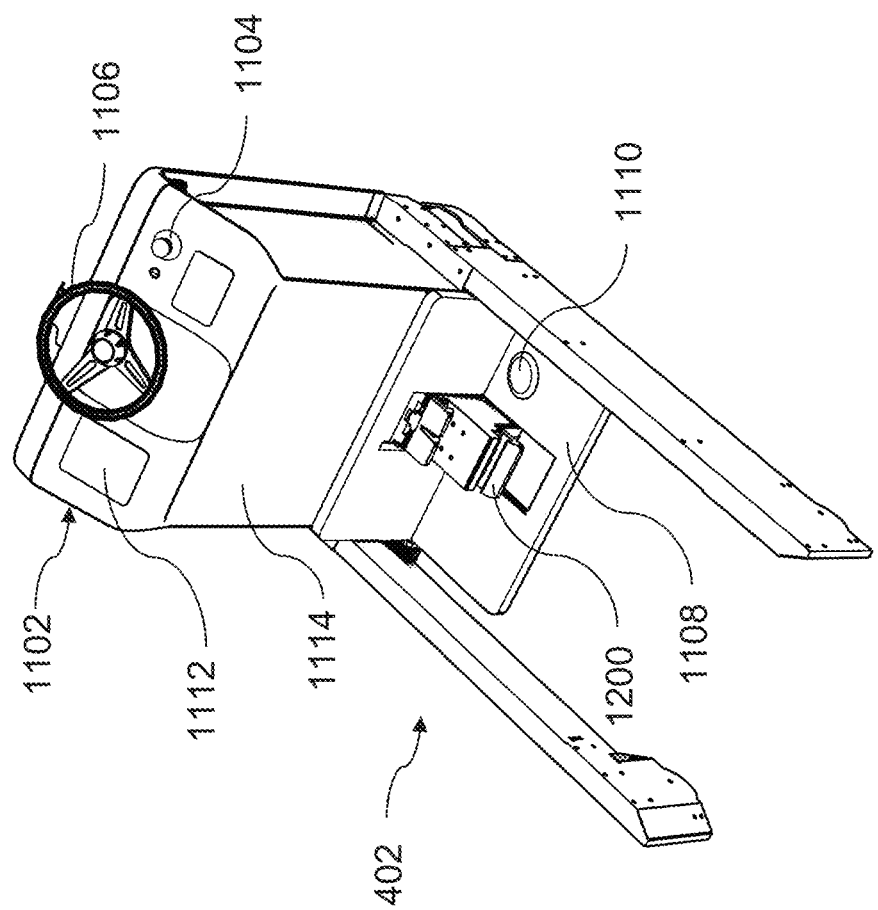
FIG. 11 is a robotic tug, according to an exemplary embodiment.

FIG. 11 is an illustrative view of a robot 402 with a latch module 1200, described next in FIG. 12A-C, incorporated therein that is configured to tug along or pull at least one cart as the cart sits or nests within the robot 402. The robot 402 illustrated, and further discussed below, is configured to operate either automatically or manually as it travels along a desired trajectory of a path following method 100 of FIG. 1 above.

The robot 402 illustrated may comprise a control panel 1102, the control panel 1102 further comprising at least a throttle control 1104 and a steering wheel 1106 for use in operating the robot 402 in a manual mode. The throttle control 1104 may control a speed of the robot 402 in a forward direction of travel, wherein the direction of travel may be changed by a user steering the steering wheel 1106. The robot 402 may further comprise a footplate 1108 upon which the user may stand during operation of the robot 402 in the manual mode. The footplate 1108 may further comprise a pedal 1110 configured to, upon receipt of a user input (e.g., the user stepping on the pedal 1110), send a signal to a controller 422 to activate one or more actuator units 408 to accelerate the robot 402 up to a speed indicated by the throttle control 1104. The robot 402 may maintain the speed indicated by the throttle control 1104 until the input from the pedal 1110 is no longer detected. The pedal 1110 in this embodiment may be a binary input (i.e., on or off). Other embodiments of a pedal 1110 may effectuate speed of the robot 402 based on a depression from an initial state of the pedal by a foot the user, wherein a separate throttle control 1104 may not be necessary in these embodiments. Lastly, the control panel 1102 may comprise a user interface 1112, similar to a user interface 804 illustrated in FIG. 8A-B above, wherein the user may provide an input to the user interface 1112 to switch the robot 402 between manual and autonomous modes of operation.

The control panel 1112 is positioned atop an armature 1114 of the robot 402. The armature 1114 may comprise of a portion extending vertically from a base 1402, illustrated in FIG. 14 below, such that the control panel 1102, and components thereof, are readily accessible to a user standing atop the footplate 1108 during operation of the robot 402 in the manual mode. The armature 1114 of this embodiment of a robotic tug may further comprise one or more operative units 402, power supply 420, controller 422, and memory 424 depicted in FIG. 4 above.

According to at least one non-limiting exemplary embodiment, a control panel 1102 may further comprise a button, or other sensory input, to for a user to activate a latch module (e.g., latch module 1200, described next in FIG. 12A) to attach to or release an object.

Figure 12A:
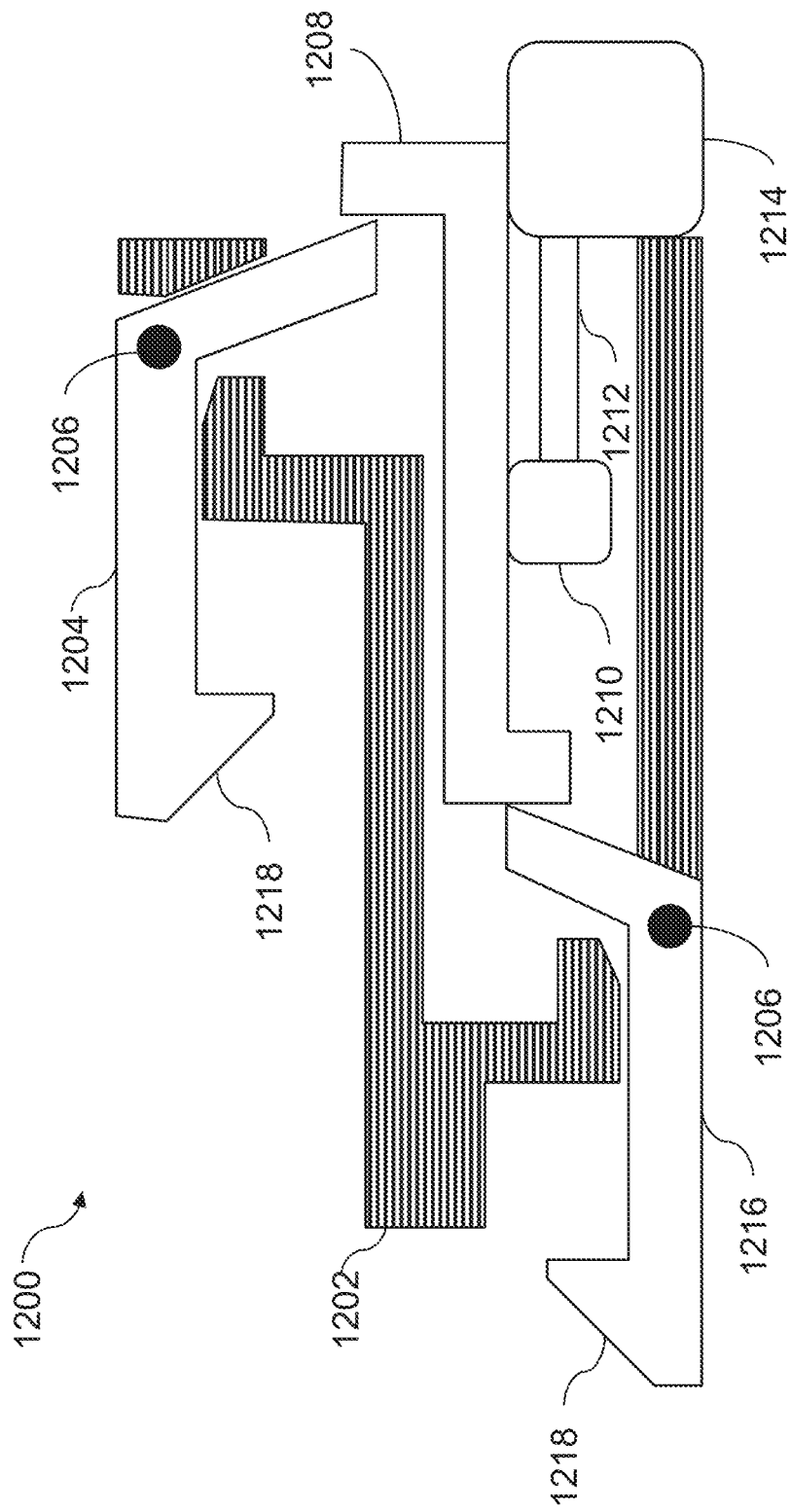
FIG. 12A-C illustrates a latch module utilized to attach a load or an object to a robotic tug, according to an exemplary embodiment.

FIG. 12A is a side view of a latch module 1200, with side panels removed, to illustrate internal components of the latch module 1200, according to an exemplary embodiment. The latch module 1200 may be configured to attach to two different types of carts (e.g., rocket carts, shopping carts, ladder carts, etc.). The latch module 1200 may comprise two latches 1204 and 1216, illustrated in the closed position in FIG. 12A, configured to securely attach to a corresponding particular type of cart. The two latches 1204, 1216 are illustrated in their closed configuration in FIG. 12A. For example, a first latch 1204 may be configured to operatively engage with a rocket cart, and a different second latch 1216 may be configured to operatively engage ladder cart. One skilled in the art would appreciate the foregoing to not be a limiting embodiment, wherein the first latch 1204 may be configured to operatively engage the ladder cart, and the second latch 1216 may also be configured to operatively engage ladder cart. However, it would be appreciated that latch module 1200 may only engage one type of cart at a time. Only upon disengagement of the cart from the respective latch may it engage with a subsequent secondary respective cart. As shown in FIG. 12A, the first and second latches 1204, 1216 are spatially separated or spaced apart from each other.

It is appreciated that latch module 1200 may be configured to attach any cart type to a robot 402, wherein rocket and ladder carts are intended to be illustrative and not limiting. Carts comprise differing shapes and sizes for differing use cases. For example, ladder carts, comprising a (retractable) ladder on wheels, may comprise a different structure (i.e., chassis) than a shopping cart. Portions of different cart types at which latches 1204 and/or 1216 affix to may be at differing positions, wherein use of two latches 1204 and 1216 configures the latch module 1200 to affix at least two cart types to a robot 402. An environment of a robot 402 may comprise multiple different cart types, wherein latch module 1200 is configured to affix a robot 402 to at least two of the cart types. It is further appreciated by one skilled in the art that a latch module 1200 may be utilized to affix a robot 402 to objects other than carts, wherein use of carts is intended to be illustrative and nonlimiting.

Further, as shown in FIG. 12A, latch module 1200 includes a component 1202 that acts as a divider, spacer or divider between latches 1204, 1216. As shown, component 1202 extends longitudinally in parallel configuration to first and second latches 1204, 1216 in closed configuration of the first and second latches. Component 1202 is also parallel to a motional arm 1208 and a shaft 1212. A first spacing, opening, or slot is formed between component 1202 and the first latch 1204, and a second spacing, opening or slot is formed between the component 1202 and the second latch 1216. These openings are sized and configured to receive a respective cart therein such that the respective latches 1204, 1216 can properly engaged and secure the received cart therein.

Figure 12B:
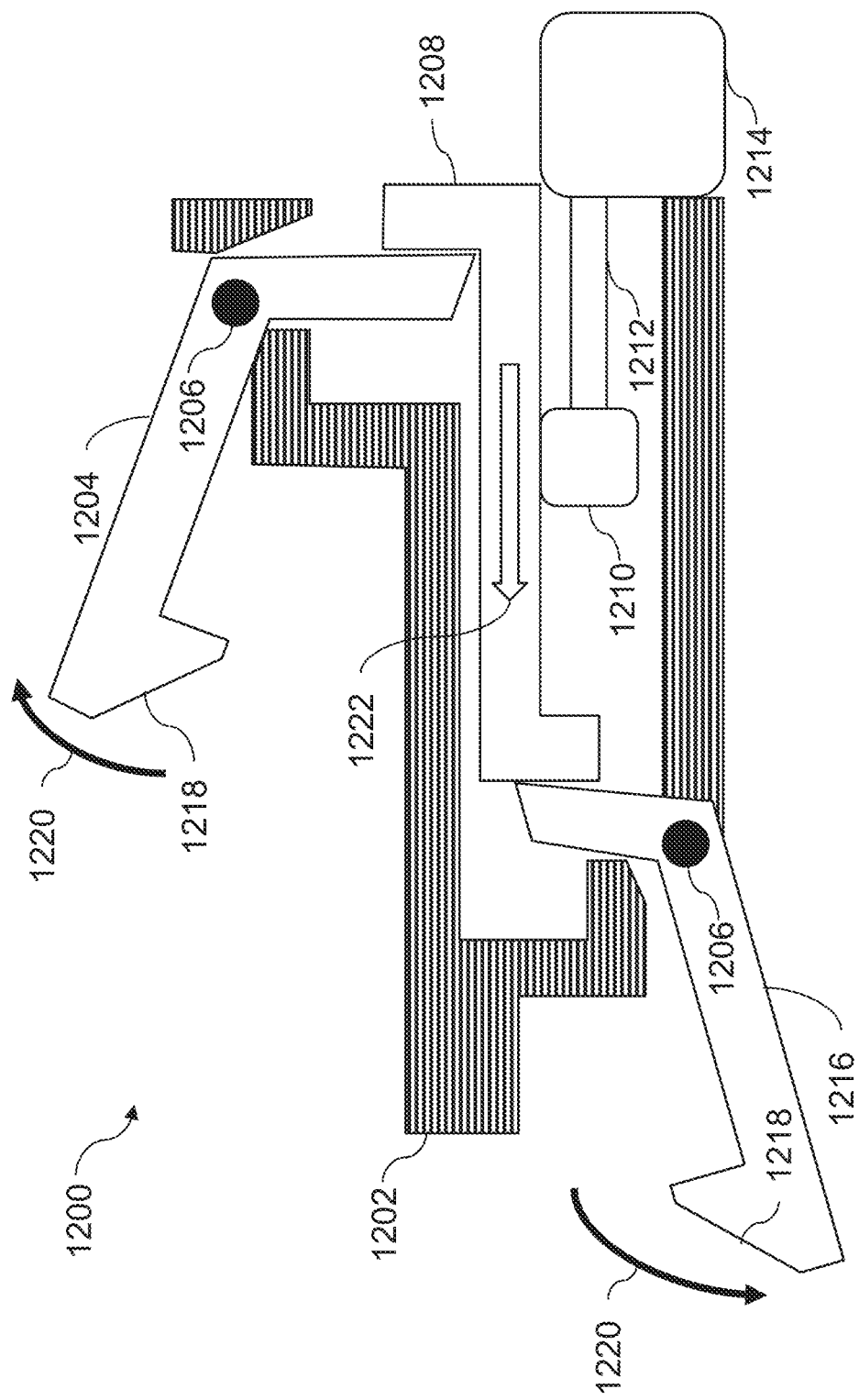
Figure 13:
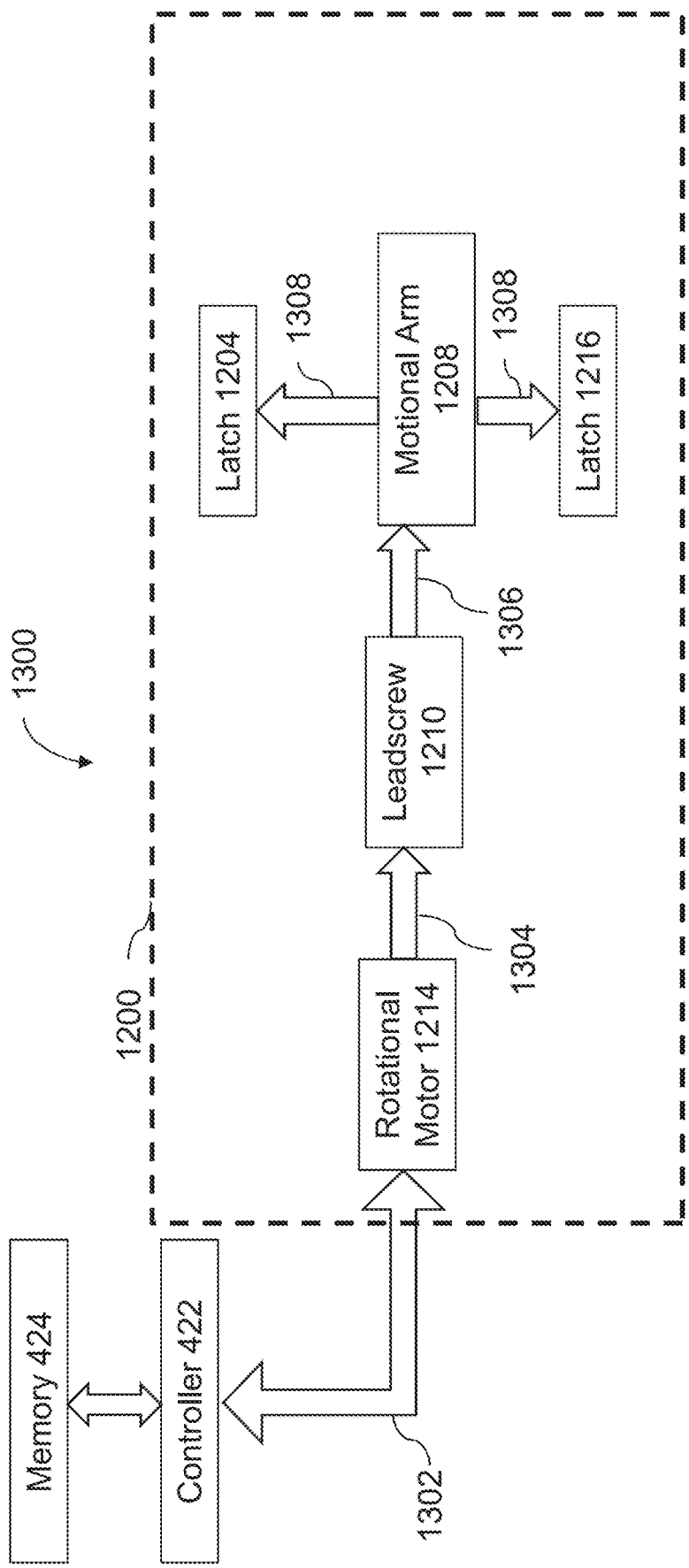
FIG. 13 is a functional block diagram of a latch module, according to an exemplary embodiment.

The state of the latches 1204 and 1216 (e.g., open or closed) is determined by a position of a motional arm 1208, wherein the motional arm 1208 may push the latches 1204 and 1216 into an open position, as shown in FIG. 12B, or allow the latches to return to a closed position, as shown in FIG. 12A. Translational motion of the motional arm 1208 may be configured using a leadscrew 1210 that is coupled to a rotational motor 1214 via a shaft 1212. The leadscrew 1210 may be configured to convert rotational motion of the shaft 1212 into translational motion of the motional arm 1208 between a first position and a second position as illustrated in FIGS. 12A-12B. Stated differently, the motor 1214 upon being activated rotates the shaft 1212, which in-turn rotates the lead screw 1210. The rotation of the lead screw 1210 acts on the motional arm 1208 which causes the motional arm 1208 to translate back and forth as back and forth as represented by an arrow 1222 in FIG. 12B. Arrows 1220 in FIG. 12B illustrate a change of state of the latches 1204 and 1216 due to the translation 1222 of the motional arm 1208 from an initial closed state, illustrated in FIG. 12A above, to an open state, illustrated in FIG. 12B. One skilled in the art may appreciate that translation of motional arm 1208 in a direction opposite to arrow 1222 may configure latches 1204 and 1216 to move opposite to arrows 1220 to configure the latch module 1200 in a closed state, as illustrated in FIG. 12A. Rotational motor 1214 may receive signals from a controller 422 to cause the rotational motor 1214 to position the motional arm 1208 such that the latch module 1200 is in an open or closed state, as shown in FIG. 13 below. One skilled in the art would appreciate that arrows 1220 illustrate the pivoting movement of the latches 1204, 1216, about their respective pivot points 1206. Wherein, the pivoting movement of each of the respective latches is done simultaneously with respect to each other such that the latches 1204, 1216, are synchronized to open and close.

FIG. 12B illustrates a side view of the latch module 1200 illustrated in FIG. 12A with a motional arm 1208 in a second position causing the latch module 1200 to be in an open state, according to an exemplary embodiment. While in the second position, the motional arm 1208 pushes against one end of the first and second latches 1204 and 1216 to cause the latches 1204 and 1216 to rotate about their respective pivot points 1206 to result in respective latches 1204, 1216 in an open state. As shown in FIG. 12B, the first latch 1204 includes a pivot point 1206 which aids the first latch 1204 to pivot in an open and closed position. Similarly, the second latch 1216 includes it's own, different, pivot point 1206, which aids the second latch 1216 to pivot in an open and closed position upon actuation of the motional arm 1208 as discussed above. Motions of the latches 1204 and 1216 about their respective pivots 1206 are illustrated by arrows 1220, which allow the latches 1204, 1216 to rotate in a clockwise direction as they pivot to open, and rotate in a counter-clockwise direction as they pivot to close. Further, as illustrated in FIGS. 12A-B, the motional arm 1208 engages, contacts or is coupled to the first latch 1204 and the second latch 1216 at different points that are not similar to each other. The motional arm 1208 being in a z-shape or configuration includes two respective projections on its ends that respectively engage, contact or couple the first and second latches 1204, 1216.

It is appreciated that while in the closed state (shown in FIG. 12A) the latch module 1200 may still attach to a cart by the cart forcing the first and second latches 1204 and 1216 to open by pushing against slants 1218 of the first and second latches 1204 or 1216. However, while the latch module 1200 is in the closed state, the cart may not be released until the motional arm 1208 configures the latch module 1200 to an open state. Accordingly, the state of latch module 1200 illustrated in FIG. 12B may be considered to be in a release state that configures or allows the first and second latches 1204, 1216 to be in an open configuration. Thereby, such mechanism provides a safety locking mechanism for respective latches 1204, 1216 such that the cart, once engaged in the respective latch 1204, 1216, stays in a secure, locked position until released upon rotation of the motional arm 1208, as discussed above, after the robot or tugging robot reaches a desired or predetermined location to drop off or unload the cart(s). In other words, the latch module 1200 may only configure the first and second latches 1204, 1216 in an open configuration after the robot or tugging robot reaches a safe, desired or predetermined location that corresponds to dropping off or unloading.

According to at least one non-limiting exemplary embodiment, motion of a motional arm 1208 may be configured using other configurations (e.g., using translational movement of a shaft 1212, belts, etc.). For example, the underside of motional arm 1208 (i.e., a side in contact with leadscrew 1210) may be grooved such that a leadscrew 1210 may be replaced with a gear, teeth of the gear being configured within the grooves, wherein shaft 1212 may rotate the gear to effectuate translation of the motional arm 1208. That is, one skilled in the art may appreciate a plurality of systems and methods to effectuate translation of the motional arm 1208, wherein use of a leadscrew 1210 and shaft 1212 is not intended to be limiting.

According to at least one non-limiting exemplary embodiment, the first and second latches 1204, 1216 may further comprise a spring system, or similarly configured system (e.g., hydraulics), to counteract the gravitational force on the respective latch 1204, 1216 such that the respective latches 1204, 1216 do not fall to an open state due to gravity while the motional arm 1208 is in the closed position (i.e., the position illustrated in FIG. 12A). For example, pivots 1206 may be configured using coiled springs such that a force from the springs is induced on respective latches 1204 and 1216 in an opposite direction to arrows 1220 such that the latches 1204 and 1216 will remain closed unless the translational arm 1208 pushes them open as illustrated in FIG. 12B.

According to at least one non-limiting exemplary embodiment, latch module 1200 may be equipped with sensor units configured to communicate to a controller 422 a state of the latch module 1200 (e.g., closed or open) and/or communicate a presence of a cart attached to the latch module 1200. These sensor units may further communicate to the controller 422 a type of object attached to the latch module 1200 (e.g., a ladder cart, shopping cart, etc.) based on, for example, RGB camera data. These sensor units may include, but are not limited to, LiDAR sensors, pressure sensors, contact sensors, camera sensors, and/or sensor units 414. In some embodiments, a sensor may be configured to measure a weight of an attached load, the weight may alter a stopping distance of the robot 402, wherein a controller 422 may account for the increased stopping distance with the attached load during navigation near stationary objects 606 and/or moving objects 714 (e.g., by stopping at a farther distance from objects with loads attached) as an added safety measure.

According to at least one non-limiting exemplary embodiment, a controller 422 may activate one or more actuator units 408 coupled to a latch module 1200 to raise and lower a height of the latch module 1200 from a floor. Adjusting the height of the latch module 1200 may further enable a robot 402 to attach to multiple types of objects using a same latch module 1200 by adjusting a height of the latch module 1200 to be suitable for attachment to different objects.

Advantageously, the use of a motional arm 1208 to configure two latches 1204 and 1216 to a closed or open/release state may enhance the ability of a robot 402 to attach and move multiple different types of objects (e.g., different carts such as rocket carts, ladder carts, etc.) using the same latch module 1200.

Figure 12C:
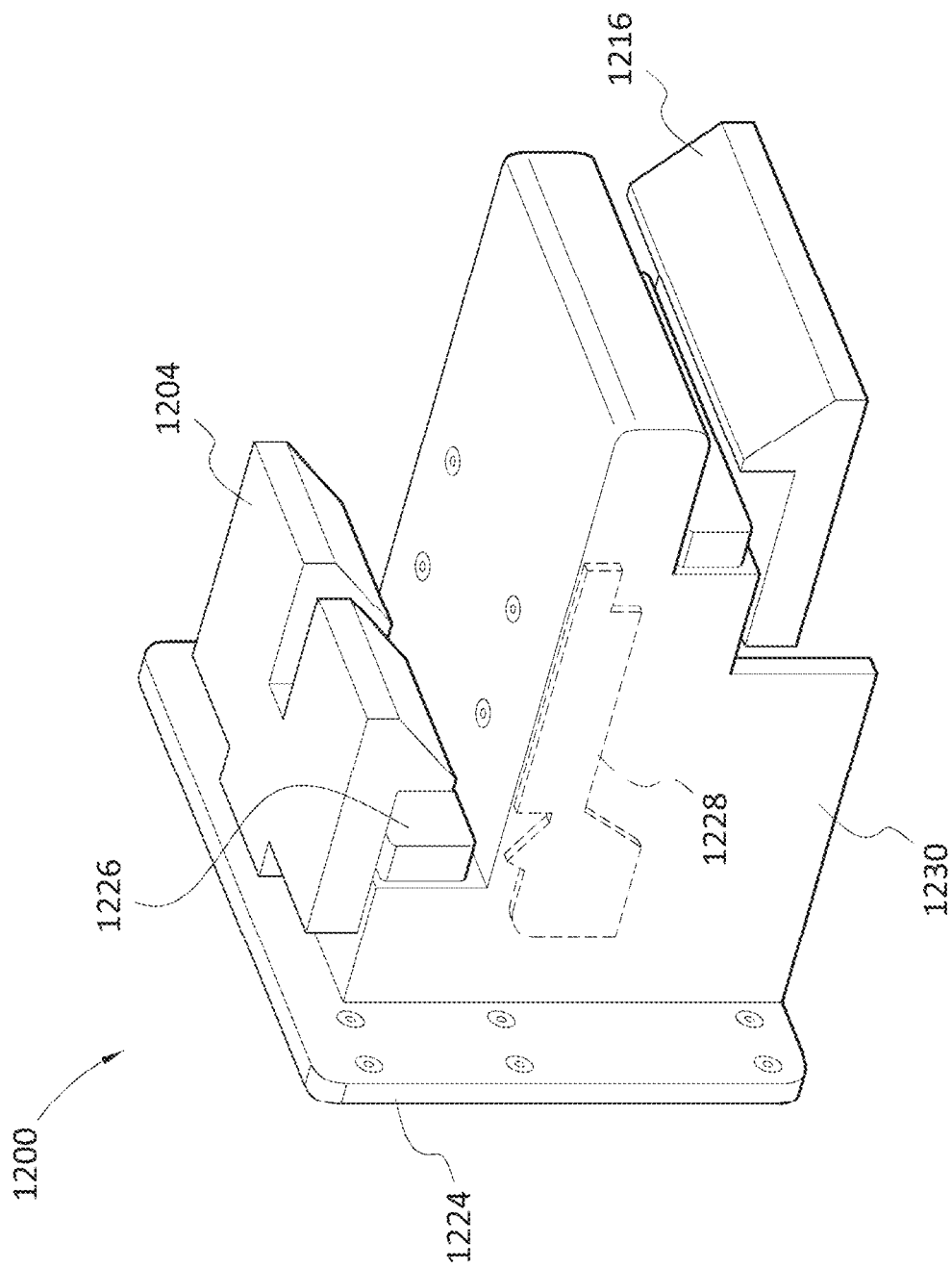

FIG. 12C illustrates a rendering of a computer aided design (CAD) model of a latch module 1200, illustrated in FIGS. 12A-B above, with the first and second latches 1204 and 1216 in a closed state, according to an exemplary embodiment. FIG. 12C illustrates an outer casing 1230 of the latch module 1200 made of solid material (e.g., metals, plastics, alloys, etc.). The latch module 1200 may mount to a chassis of a robot 402 by attaching to the chassis via plate 1224 using, for example, screws. The outer casing 1230 of the latch module 1200 may further comprise pads 1226, behind the first latch 1204, to provide cushioning for objects to be attached to the latch module 1200. According to at least one non-limiting exemplary embodiment, pads 1226 and/or outer casing 1230 may be equipped with sensor units to detect a presence of an object attached to the latch module 1200. Casing 1228 provides housing for the motional arm 1208 illustrated in FIG. 12A-B above. It is appreciated that rotational motor 1214, shaft 1212, and leadscrew 1210 have been omitted from FIG. 12C for purposes of clarity.

According to at least one non-limiting exemplary embodiment, plate 1224 may attach to a moveable surface of a robot 402 such as, for example, a belt, such that a vertical position of the latch module 1200 may be configured at a variable height to attach to a multiple types of objects, wherein the vertical positioning of the latch module 1200 may be controlled by a controller 422 of the robot 402 activating an actuator unit 108.

According to at least one non-limiting exemplary embodiment, a latch module 1200 may further comprise sensors configured to detect and identify a type of load attached to the module 1200, and thereby attached to a tug robot 402. The sensors may comprise of, for example, NF-ID, RF-ID, LiDAR sensors, RGB cameras, pressure/contact sensors, sensors configured to detect and decode signals communicated by marker 518 indicating a type of load 506, and so forth. As discussed above with respect to FIGS. 5A-B, markers 518 may be coupled to drop-off and pick-up locations that emit a wireless signal which communicate with a robot 402 that is traveling to and from a drop-off or pick-up location. The type of load attached to the latch module 1200 may be communicated to a controller 422 such that the controller 422 may plan a route to a drop-off location 510 corresponding to a predetermined place for detaching from the load of the detected type (e.g., shopping cart, carts with items for stocking shelves, etc.).

One skilled in the art would appreciate that engaging an object such as a cart into the latch module 1200, the respective cart, or portions thereof, may be slid into either the slot formed between component 1202 and the first latch 1204 or between slot formed between component 1202 and the second latch 1216. Depending on the cart being engaged with the latching mechanism, the respective latch 1204 or 1216 may engage with the cart and be securely engaged therewith. Stated differently, an object such as a cart may only couple or engage with a respective latch 1204 or 1216 while not engaging or coupling with the other respective latch 1204 or 1216. Further, one skilled in the art would appreciate that each of the respective latches 1204, 1216 may engage with respective cart independent of each other and may function simultaneously and in unison with each other as such a robot may tug or pull two different types of cart at the same time as they engage with the respective latch 1204, 1216. Stated differently, the respective latch 1204, 1216 act independent of each other and simultaneously engage and disengage different types of carts. At the same time or consecutively, the first latch 1204 may engage or couple with one type of a cart and the second latch 1216 may engage or couple a different type of a cart.

FIG. 13 illustrates a block diagram of a system 1300 for a controller 422 of a robot 402 to operate a latch module 1200, according to an exemplary embodiment. The controller 422 may utilize data stored in memory 424 to generate a control output or control signals 1302 to a rotational motor 1214, the data may include sensor data, localization and map data, user inputs, etc. Control signals 1302 may configure the rotational motor 1214 output rotational energy 1304 via shaft 1212, illustrated in FIG. 12A-B above, to effectuate motion of a motional arm 1208. Signals 1302 may further comprise feedback signals from the rotational motor 1214 to the controller 422. Rotational energy 1304 outputted from the rotational motor 1214 may be converted to translational energy 1306 of the motional arm 1208 by a leadscrew 1210. The translational energy 1308 of the motional arm 1208 may effectuate positions (open or close) of latches 1204 and 1216 as illustrated in FIG. 12A-B above.

According to at least one non-limiting exemplary embodiment, rotational energy 1304 from the rotational motor 1214 may be converted to translational energy 1306 of the motional arm 1208 using a gearing system, belt system, or other substantially similar system for converting rotational motion of shaft 1212 to translational motion of the motional arm 1208. According to at least one non-limiting exemplary embodiment, controller 422 may additionally output control signals to a moveable surface of which plate 1224, illustrated in FIG. 12C above, is mounted such that the height of latch module 1200 may be adjusted according to a desired cart type of which the latch module 1200 is to attach to.

According to at least one non-limiting exemplary embodiment, latch module 1200 may further comprise one or more sensor units (e.g., proximity sensors, bump sensors, etc.), wherein data from these sensor units may additionally be outputted from the latch module 1200 to the controller 422 via signals 1302.

One skilled in the art may appreciate that a robot 402 tug may comprise a latching mechanism different from the latch module 1200 illustrated in FIG. 12-13 and still achieve substantial advantages over contemporary designs of robotic tugs using other systems and methods of this disclosure. That is, use of the latch module 1200 illustrated and described herein is intended to be illustrative of an exemplary embodiment of a mechanism used to attach carts to a robotic tug, and is not intended to be limiting.

Figure 14:
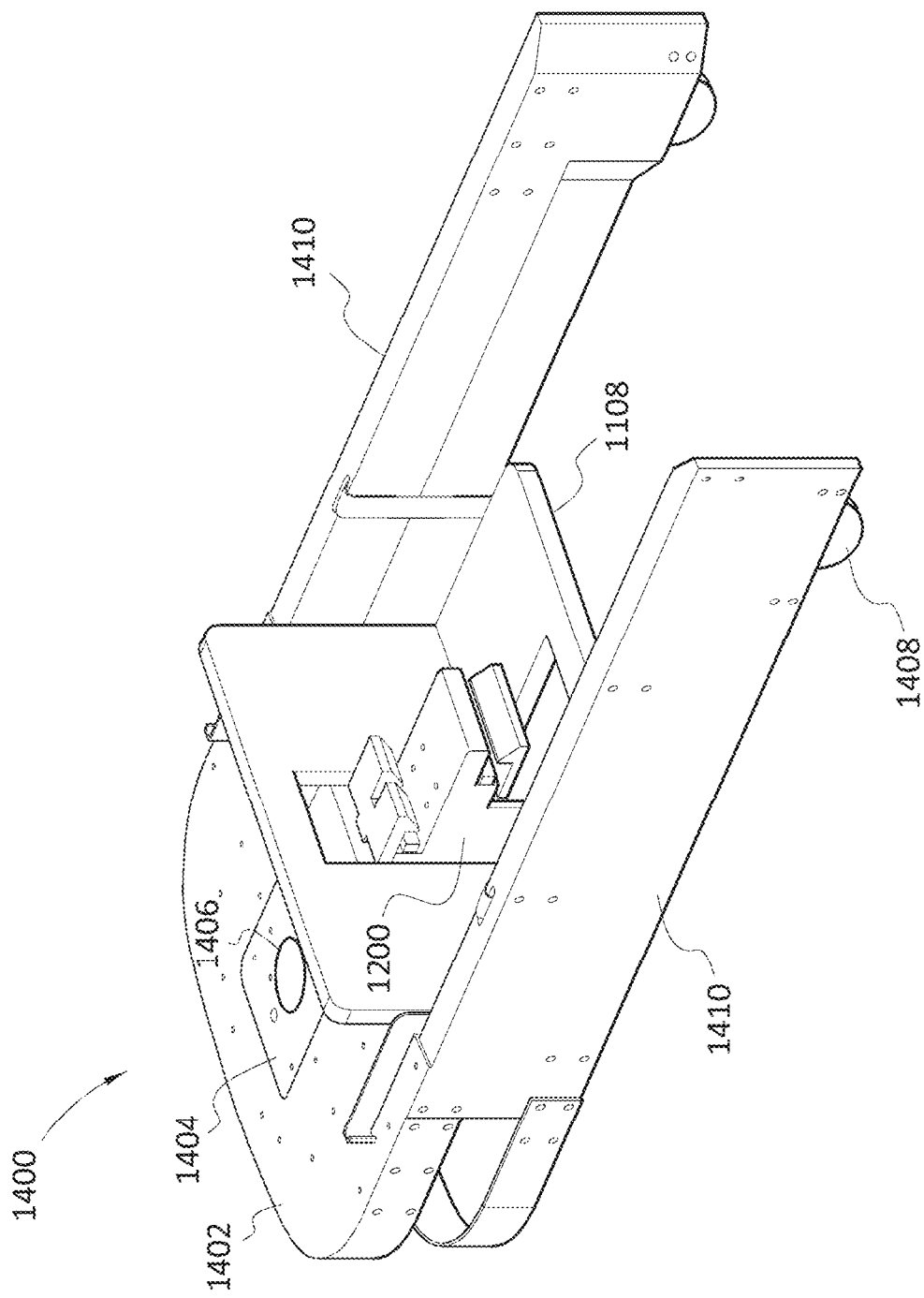
FIG. 14 is a portion of a chassis of a robotic tug comprising a latch module shown in FIGS. 12A-C, according to an exemplary embodiment.

FIG. 14 illustrates a lower portion 1400 of a tug robot 402 comprising the latch module 1200 depicted in FIG. 12A-C above, according to an exemplary embodiment. Base 1402 may comprise of a substantially flat surface of which components of the tug robot 402 (e.g., batteries, circuitry, sensors, etc.) may be mounted upon, as shown in FIG. 11. The base 1402 may comprise a steering shaft base 1404 of which a steering column may be positioned through opening 1406, wherein the steering column may be coupled to one or more wheels, or other conventional locomotion system, below the base 1402. The latch module 1200 may attach to the base 1402, steering shaft base 1404, and/or longitudinal beams 1410. The lower portion 1400 of the robot 402 may further comprise a footplate 1108 mounted between longitudinal beams 1410 such that a human operator may stand upon the footplate 1108, while no object is attached to the latch module 1200, to operate the tug robot 402 in a manual mode (e.g., by driving the tug as a chariot). In some embodiments, footplate 1108 is further configured to be retractable, detachable, or foldable to be stored away during autonomous operation of the tug robot 402.

Longitudinal beams 1410 may additionally comprise rear wheels 1408 such that when the latch module 1200 attaches to a cart, a 'turn center' of the cart and robot 402 lies between the two longitudinal beams 1410 opposite each other. Advantageously, positioning the turn center of the tug robot 402 system between longitudinal beams 1410 yields an unconventional result in that the ability of the tug robot 402 to control movement of the cart is enhanced, as will be illustrated in the figures below.

Figure 15:
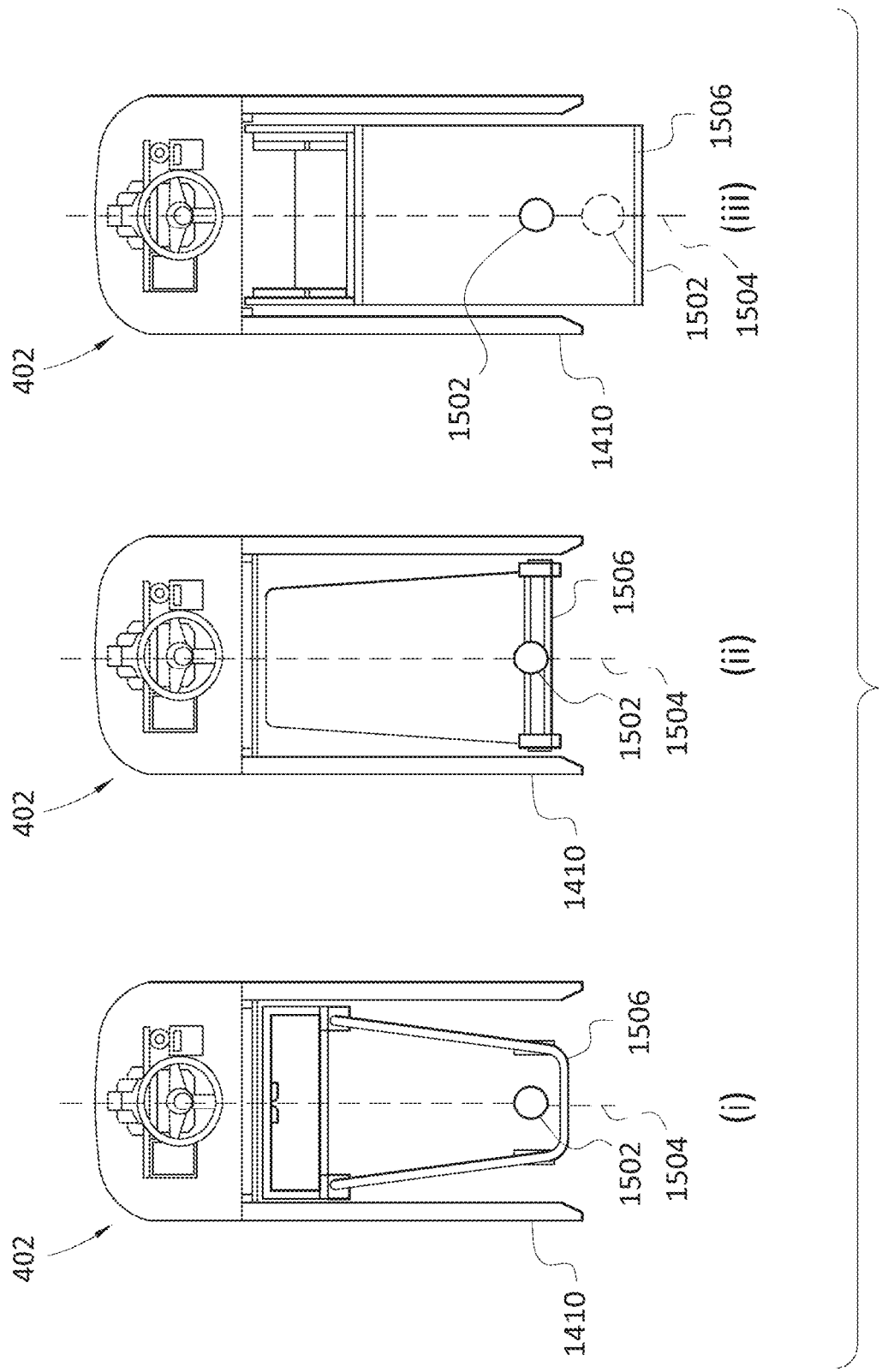
FIG. 15 illustrates three robots with three different cart types nested therein, according to an exemplary embodiment.

FIG. 15(*i-iii*) is a top view of three robots 402 with three carts 1506 of different types attached to a latch module 1200 (not shown, but illustrated in FIGS. 11 and 12A-C), according to an exemplary embodiment. The three carts 1506 illustrated may comprise of, without limitation, three embodiments of a shopping cart; a ladder cart, shopping cart, and pushcart; or any embodiment of an object comprising wheels, or other conventional means of locomotion, which may be attached to and tugged by a robot 402. It is appreciated that the three robots 402 illustrated comprise a single actuated and turntable wheel located at a front of the robots 402 and passive wheels in fixed position wheels 1408 located on each respective longitudinal beams 1410 such that motion of the robot 402 is non-holonomic (i.e., constrained along at least one degree of freedom due to the fixed position wheels 1408). Other wheel configurations are considered, wherein the configuration illustrated is exemplary and not intended to be limiting. Similarly, carts 1506 may be replaced with any movable object comprising wheels, or other conventional locomotion systems, and are not intended to be limiting.

Upon the latch module 1200 attaching to a respective cart 1506, a vertical center 1504 of the cart 1506 and robot 402 are substantially aligned with respect to each other such that they are similar to one another. Stated differently, the robot 402 includes its own vertical center 1504 and the cart 1506 includes its own respective, independent vertical center 1504, wherein attachment of the cart to the robot 402 aligns their respective vertical centers 1504. The length of the longitudinal beams 1410, which are parallel to each other, in some instances is long enough to be at least equivalent to the length of the cart 1506 placed therein, thereby configuring the cart 1506 to nest or entirely be placed within the confines of the robot 402.

A vertical center 1504 may correspond to an imaginary line or axis comprising a geometric center between wheels 1408 of the robot 402 or cart 1502 extending from the front to the back of the robot 402 and/or cart 1506. As illustrated, due to a nested design of the robot 402, the vertical centers 1504 of the robot 402 and cart 1506 align substantially with each other. A turn center 1502 may comprise of a point of about which a robot 402 and/or a cart 1506 may turn about. In other words, turn center 1502 may represent a point of rotation for a vertical center 1504 of the robot 402 and/or cart 1506 as the robot 402 and/or cart 1506 executes a turn. For example, carts 1506 comprising a pair of fixed position wheels and a pair of freely rotating wheels comprise a turn center 1502 positioned between the fixed position wheels. Turn center 1502 for a robot 402 illustrated is positioned at the distal most end of the robot 402, farthest away from the latch module 1200, on vertical center 1504 and in between the rear fixed position wheels 1408, illustrated in FIG. 14 above.

One skilled in the art would appreciate that a turn center 1502 may be anywhere along axis of the vertical center 1504 between the latch module 1200 and the rear wheels 1408 of robot 402 based on a configuration of wheels of the robot 402 and/or wheel configuration of the cart 1506. Accordingly, wheels of carts 1506 illustrated in FIG. 15 closest to a latch module 1200 comprise freely rotating wheels, wherein wheels of the carts 1506 closest to distal ends of the longitudinal beams 1410 may comprise fixed caster wheels or non-rotatable wheels. Carts comprising only fixed caster wheels are not further discussed as they may not be turned without sliding the wheels over a floor which may leave marks or emit unpleasant noises; however, the systems and methods of this disclosure may still apply to this case if the marks or unpleasant noises are permissible.

In some embodiments, robot 402 and/or cart 1506 may comprise four rotatable wheels, wherein the robot 402 and/or cart 1506 may rotate (i.e., turn) about any point. That is, the robot 402 and/or cart 1506 may follow holonomic (i.e., unconstrained) motions. In some embodiments, the cart 1506 is holonomic while a robot 402 is non-holonomic (i.e., constrained in its motion), wherein the cart 1506, when attached to the robot 402, will follow constrained motions of the robot 402 as the cart 1506 is not constrained in its movement. In some embodiments, the robot 402 is holonomic but an attached cart 1506 is non-holonomic, wherein the robot 402 is constrained to the non-holonomic motions of the cart 1506 such that a turn center 1502 of the holonomic robot 402 is constrained to turn center 1502 of the non-holonomic cart 1506. In some embodiments, both a robot 402 and attached cart 1506 are holonomic, wherein the robot 402 and cart 1506 system may comprise no constraints in its motion.

Systems comprising a non-holonomic robot 402 and non-holonomic cart 1506 are further illustrated in FIG. 15 as alignment of turn centers 1502 between the robot 402 and cart 1506 is necessary to configure turning in place of the cart 1506 without sliding (i.e., skidding, dragging, etc.) wheels of the cart 1506 over a floor. The systems illustrated may similarly illustrate a holonomic robot 402 being attached to a non-holonomic cart 1506 if wheels 1408 of longitudinal beams 1410 may rotate freely, wherein motions of the robot 402 are constrained to non-holonomic motions of the cart 1506 to avoid sliding or dragging of fixed position wheels of the cart over a floor as the robot 402 and attached cart 1506 execute a turn in place.

Non-holonomic constraints to motion of the robot 402 and/or cart 1506 may correspond to constraints to motion of respective vertical centers 1504, wherein the vertical centers 1504 of the robot 402 and/or cart 1506 are constrained in motion perpendicular to the axis of the vertical centers 1504 due to the robot 402 and/or cart 1506 comprising at least one pair of fixed caster wheels. Turning in place, as used herein, comprises a robot and cart system turning about a turn center 1502 located within parameters of (i.e., area occupied by) the robot 402. The robot 402 may attach to a cart 1506 such that a pair of rotatable wheels of the cart 1506 are closest to the latch module 1200 and fixed caster wheels of the cart 1506 lie between wheels 1408 of longitudinal beams 1410.

For example, FIG. 15(*i*) illustrates an attachment of a first cart 1506 to a robot 402. The first cart 1506 is attached to the robot 402 such that a rear end of the cart 1506, farthest from its fixed caster wheels, is affixed to the latch module 1200. Similarly, FIG. 15(*ii*) illustrates a second cart 1506 affixed to latch module 1200 of a robot 402 such that a rear end of the second cart 1506, closest to freely rotating wheels, lies near a distal end of longitudinal beams 1410. Both the first and second carts 1506 are affixed to their respective robots 402 such that their fixed caster wheels lie between and in parallel to wheels 1408 at distal ends of longitudinal beams 1410 and their rotatable wheels lie closest to the latch module 1200. Attaching carts 1506 in this way aligns the turn centers of the carts 1506 with a turn center 1502 of the robot 402, wherein both turn centers 1502 lie along a substantially aligned vertical center 1504 of the cart and robot system. Aligning the turn centers 1502 of the robot 402 and attached carts 1506 enables the robot and cart system to turn simultaneously in place about the aligned turn centers 1502 as the robot 402 executes the turns.

FIG. 15(*iii*) illustrates an attachment of a long cart 1506 to a robot 402. The long cart 1506 may comprise a pair of rotatable wheels near an end closest to a latch module 1200 of the robot 402 and a pair of fixed, or freely moving, caster wheels beyond a distal end of longitudinal beams 1410. Long cart 1506 may similarly be illustrative of a plurality of shopping carts stacked end to end. The fixed caster wheels of the long cart 1506 may lie beyond the wheels 1408 of longitudinal beams 1410, thereby positioning a turn center 1502 of the long cart 1506, illustrated by a dashed circle, beyond or distal to a turn center 1502 of the robot 402, illustrated by a solid circle. Vertical centers 1504 of the robot 402 and long cart 1506 may still align and continue to be aligned as the robot 402 executes turns, as illustrated in FIG. 16B. If the robot 402 performs a turn in place (i.e., about the turn center 1502 of robot 402), rear fixed caster wheels of the long cart 1506 may slide along a floor due to the misalignment of the turn centers 1502. Due to latch module 1200 holding the long cart 1506 in a fixed position, vertical center 1504 of the robot and long cart system may rotate about the turn center 1502 of the robot 402 due to the robot 402 effectuating turns, thereby causing the fixed caster wheels of the cart 1506 to slide or skid along a floor as the long cart 1506 rotates about a turn center 1502 of the robot 402 and not its respective turn center 1502. Sliding wheels of the long cart 1506 along a floor may emit unpleasant noises and leave scratches or marks on the floor which may be undesirable. The robot 402 may avoid sliding the fixed caster wheels over the floor by executing wide turns with the long cart 1506 attached.

One skilled in the art may appreciate that turn centers of the robot 402 and cart 1506 may substantially align at one or more points beyond parameters of the robot 402 corresponding to the robot 402 executing a turn comprising a sufficiently large radius. Stated differently, misalignment of the turn centers 1502 of the robot 402 and attached long cart 1506 requires the robot 402 to execute turns of nonzero radius to avoid sliding fixed caster wheels of the long cart 1506 over a floor, whereas robots 402 of FIG. 15(*i-ii*) may turn substantially in place (i.e., turns with zero or substantially small radius). The radius of the turn being substantially larger than a spatial distance between two misaligned turn centers 1502 such that negligible or no sliding of fixed caster wheels is achieved. It is appreciated that a substantially similar misalignment of turn centers 1502 may occur when a robot 402 attaches to a short cart 1506 thereby constraining the robot 402 to execute turns of non-zero radius, wherein a long cart 1506 is not intended to be limiting. That is, alignment of turn centers 1502 of a cart 1506 and robot 402 is not intended to be limiting; however, the alignment, using the nested design disclosed herein, may provide further improvement to robotic tugs by enabling robotic tugs, in some instances, to turn substantially in place. In other instances, where turn centers 1502 do not align, robotic tugs using the systems and methods of this disclosure may still transport carts 1506, and other objects, from one location to another by simply executing wide turns. Improved control by a robot 402 over motions of the cart 1506 may still be achieved due to alignment of vertical centers 1504 of the robot 402 and cart 1506, as illustrated in FIG. 16B below.

According to at least one non-limiting exemplary embodiment, long cart 1506 of FIG. 15(*iii*) may comprise of a holonomic cart 1506 (i.e., comprising only freely rotating wheels configuring motion of the cart to be unconstrained along any direction), wherein attachment of the holonomic cart 1506 provides no additional constraint to motion of a robot 402 of which the cart 1506 is attached thereto. If no additional constraint to motion of the robot 402 is imposed due to an attachment of a holonomic cart 1506, alignment of turn centers 1502 and vertical centers 1504 is not a requirement for the robot 402 to execute turns in place and/or tug the cart 1506 from one location to another.

According to at least one non-limiting exemplary embodiment, a robot 402 may avoid attaching objects comprising a misaligned turn center (e.g., long cart 1506, a plurality of stacked carts 1506, etc.) as turning with a nonzero radius may be unsafe in some environments (e.g., crowded environments with lots of humans unaware of motions of potential the robot 402). In other instances, turning with a nonzero radius may be permissible (e.g., in warehouses with large open regions and/or with skilled workers aware of operations and movements of the robot 402 with objects attached thereto).

According to at least one non-limiting exemplary embodiment, longitudinal beams 1410 are coupled to at least one actuator configured to extend or retract the beams 1410, thereby positioning wheels 1408 further or closer to a latch module 1200 and/or front of a robot 402. Positioning the wheels 1408 further or closer to the front of the robot 402 may further position a turn center 1502 of the robot 402 further or closer from its front along vertical center 1504, thereby enabling the turn center of the robot 402 to be adjusted to match a turn center of longer or shorter carts 1506.

According to another non-limiting exemplary embodiment, a latch module 1200 may be coupled to an actuator to extend or retract the latch module 1200 closer or further from wheels 1408 at distal ends of longitudinal beams 1410. Extending or retracting of the latch module 1200 may configure a fixed caster wheels of a cart 1506 to lie in parallel with fixed position wheels 1408, thereby aligning turn centers 1502 of the cart 1506 and robot 402.

Advantageously, maintaining alignment of the vertical centers 1504 of the robot 402 and cart 1506 system within longitudinal beams 1410 may greatly enhance the ability of the robot 402 to effectuate control over movement of an attached cart 1506, as will be discussed next with respect to FIG. 16B. Configuring a tug robot 402 to comprise longitudinal beams 1410 provides an additional unconventional improvement as some carts 1506 may comprise turn centers 1502 substantially similar to turn centers 1502 of the tug robot 402, thereby enabling the tug robot 402 to turn substantially in place. Carts 1506 comprising turn centers 1502 which do not align with turn centers 1502 of a robot 402 may also be transported (i.e., tugged) by the robot 402 under a constraint that the robot 402 performs larger turns, but may be transported, nonetheless. This constraint may be communicated to a controller 422 of a robot 402 for route planning calculations while a cart 1506 is attached. For example, a sensor unit 414 may detect attachment of a long or short cart 1506 (e.g., using a RFID unit on the cart 1506 or images from a camera sensor) comprising a turn center 1502 which does not align with a turn center 1502 of the robot 402. Furthermore, configuring a cart 1506 to be nested within parameters of a robot 402 may further enhance safety of operating the robot 402 nearby humans. It is additionally appreciated that only one latch module 1200 may be utilized to attach to at least two or more of the three carts 1506 illustrated in FIG. 15.

According to at least one non-limiting exemplary embodiment, turn centers 1502 of an attached cart 1506 and robot 402-2 may not align, as illustrated in FIG. 15(iii) above. The robot 402-2 may instead execute a wide turn (i.e., a turn of nonzero radius) such that fixed caster wheels of the attached cart 1506 do not slide (i.e., are not dragged) across a floor if the turn centers 1502 do not align. Executing a wide turn maintains alignment of vertical centers 1504 of the cart 1506 and robot 402, thereby maintaining improved control by the robot 402 over motions of the attached cart 1506.

According to at least one non-limiting exemplary embodiment, alignment of vertical centers 1504 of a cart 1506 and robot 402 may be achieved using any latching mechanism which secures a cart 1506 to a robot 402 tug in a fixed position, relative to the robot 402, wherein use of the latch module 1200 described above in FIG. 12A-C is not intended to be limiting.

Figure 16A:
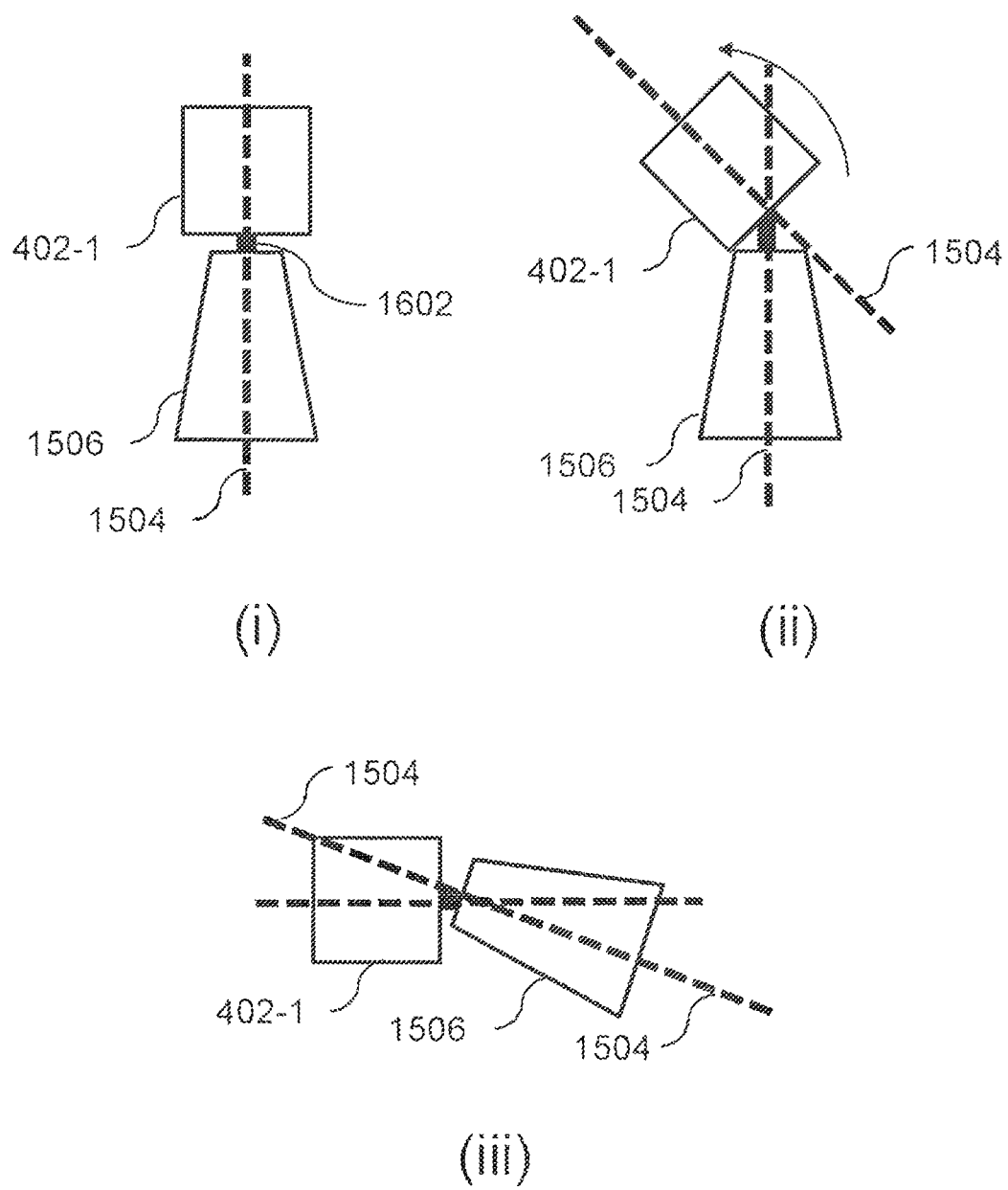
FIG. 16A($i$)-($iii$) illustrate a robot tug, comprising no nested load configuration, executing a left turn with a load attached, according to an exemplary embodiment.
Figure 16B:
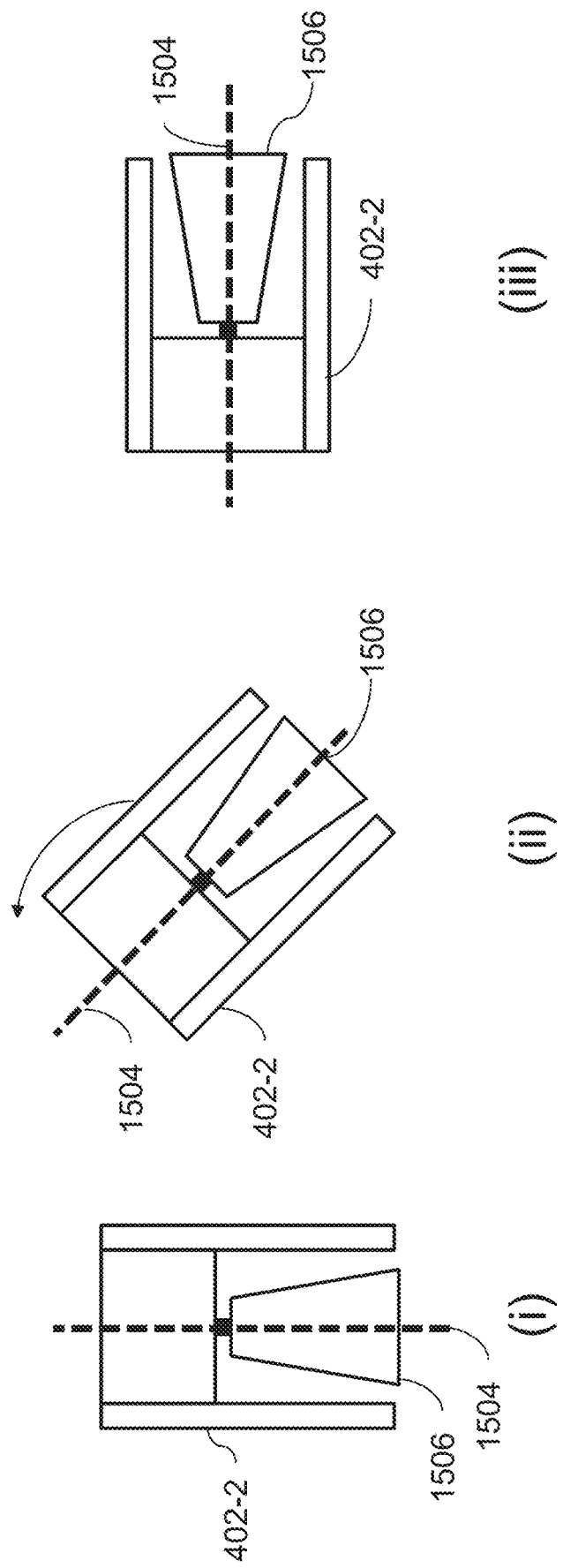
FIG. 16B illustrates a robotic tug, comprising a nested load configuration, executing a left turn with a load attached, according to an exemplary embodiment.
Figure 17A:
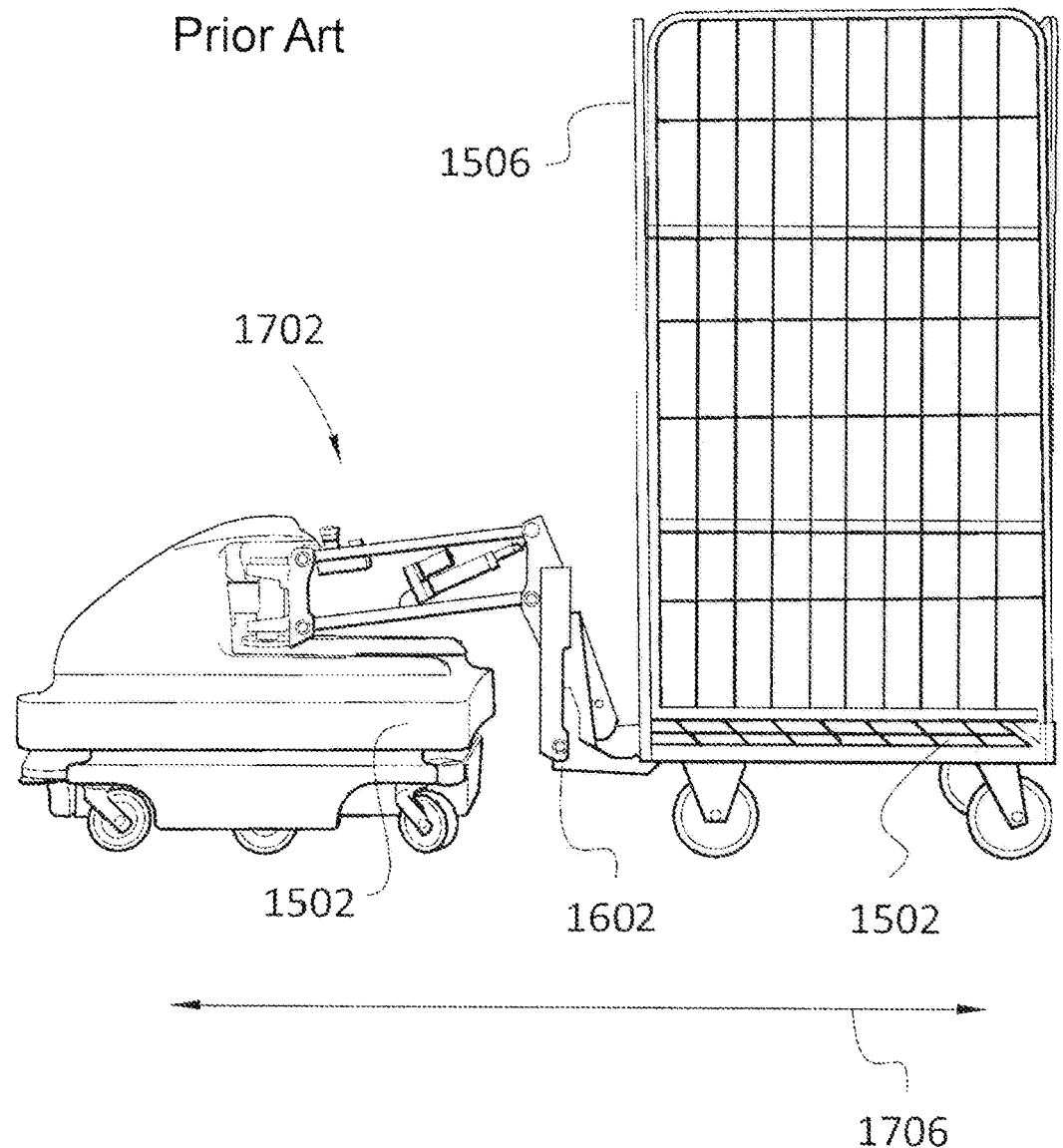
FIG. 17A illustrates a conventional design of a robotic tug.

FIG. 16A illustrates a top view of a footprint of a robot 402-1, comprising a conventional robotic tug design, attached to a cart 1506 that the robot 402-1 is configured to tug along, according to an exemplary embodiment. Robot 402-1 may not comprise longitudinal beams 1410 and may comprise a moveable latch 1602 (e.g., as illustrated by robot 1702 of FIG. 17A) such that the robot 402 may execute turns while not being constrained by potential non-holomictic movement of the cart 1506. In FIG. 16A(i), the robot 402-1 is attached to the cart 1506 via movable latch 1602. An exemplary embodiment of the movable latch 1602 is illustrated in FIG. 17A below. The robot 402-1 may execute a left turn as shown in FIG. 16A(ii) which may cause the robot 402-1 to rotate whilst the cart 1506 does not rotate, thereby causing the footprint of (i.e., area occupied by) the robot 402-1 and cart 1506 system to change shape in time as the robot 402-1 executes the turn. In other words, vertical centers 1504 of the robot 402-1 and cart 1506 become misaligned. Upon executing the turn, the robot 402-1 illustrated in FIG. 16A(iii) may face a desired direction (e.g., 90° to the left with respect to the starting position) whilst the cart 1506 may not have completed the full 90° rotation, thereby requiring the robot 402-1 to move forward to adjust the position of the cart 1506. During this process, the footprint of the robot 402-1 may change shape drastically over time, imposing a large computational cost to a controller 422 of the robot 402-1 to determine if the footprint of the robot 402-1 and cart 1506 system may overlap with a nearby objects localized on a computer readable map, corresponding to a collision of the robot 402-1 and/or cart 1506 with the object.

In contrast to the conventional design of the tug mechanism as discussed above with respect to FIGS. 16A(i)-(iii), the inventive concepts disclosed herein overcome these obstacles by employing latch module 1200 incorporated in robot 402-2 systems that allow vertical centers 1504 of the robot 402-2 and the respective cart 1506 to be aligned with each other, as shown next in FIG. 16B(i-iii). FIG. 16B illustrates a tug robot 402-2 utilizing systems and methods of this disclosure to tug a cart 1506 as the robot 402-2 executes a left turn, according to an exemplary embodiment. As the robot 402-2 makes the left turn the cart 1506 being tugged along by the robot 402-2 will also simultaneously make the left turn with the robot 402-2. This results in no change in a shape of a footprint of (i.e., no change in shape of area occupied by) the robot 402-2 and cart 1506 system, while the cart 1506 remains in a static position relative to the robot 402-2 in time as the robot 402-2 makes the left turn. This result is achieved because the robot 402-2 and the cart 1506 act as a single system or unit that have the same vertical center 1504 as discussed above with respect to FIG. 15. Additionally, turn centers 1502 of the robot 402-2 and cart 1506 may align, thereby enabling the robot 402-2 to turn in place about the turn centers 1502 with the cart 1506 attached. Lastly, as the robot 402-2 completes its full-left turn, as shown in FIG. 16A(iii), the cart 1506 attached thereto also makes or completes the full rotation with the robot 402-2. The latch module 1200, discussed above with respect to FIGS. 12A-12C, and the robot 402 with the longitudinal beams 1410 configuration allows the cart 1506 to make the complete turn as the robot 402 makes the respective turn.

According to another embodiment, any latching mechanism which configures the cart 1506 to remain in a fixed position relative to the robot 402 may achieve the same turning effect of the robot 402 and cart 1506 system as illustrated in FIG. 16B(i-iii), wherein use of the latch module 1200 detailed above in FIG. 14 is not intended to be limiting.

Figure 17B:
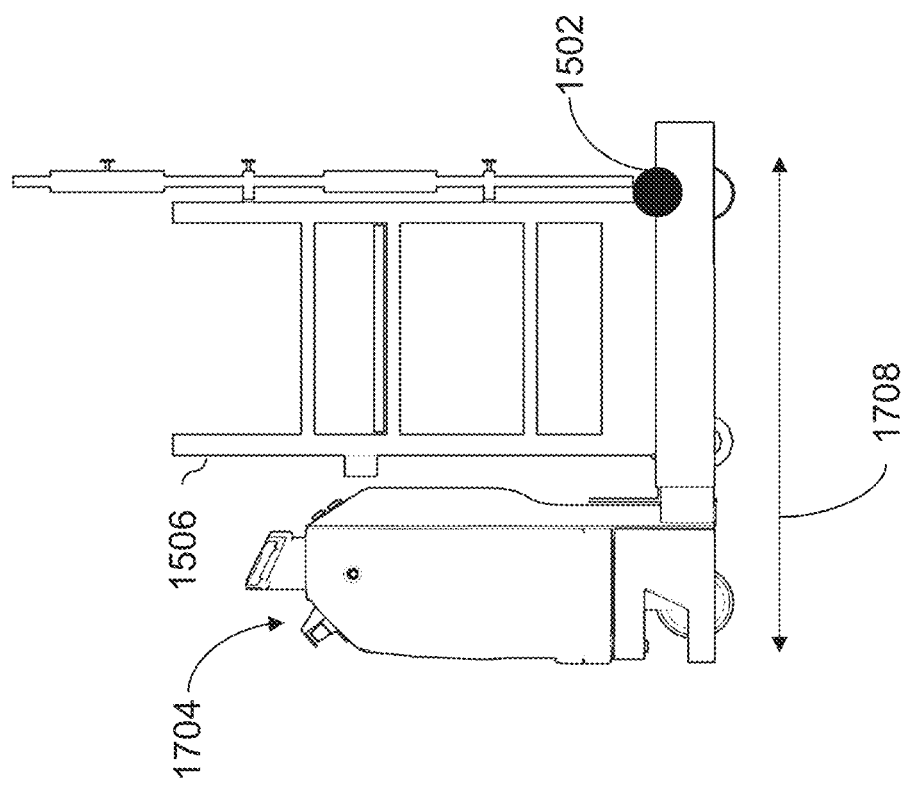
FIG. 17B illustrates a robotic tug comprising a nested design to illustrate improvements over contemporary designs according to an exemplary embodiment.

FIG. 17A is another representation of the conventional designs of robotic tugs, according to an exemplary embodiment. A robot 1702, similar to robot 402-1 illustrated in FIG. 16A, represents the conventional design of a robotic tug mechanism, wherein a cart 1506 may be tugged along by the robot 1702 via a movable attachment 1602 to the robot 1702. The movable attachment 1602 configures the cart 1506 to move relative to the robot 1702 as the robot 1702 executes turns, as illustrated from above in FIG. 16A. The cart 1506 may not have its turn center aligned with the turn center of the robot 1702 at all times (e.g., as robot 1702 turns). Additionally, vertical centers 1504 of the robot 1702 and cart 1506 may become misaligned if the robot 1702 turns. FIG. 17B, on the other hand, illustrates a robot 1704, similar to robot 402-2 illustrated in FIG. 16B, which represents the inventive concepts disclosed herein of new and improved robotic tug mechanism, wherein a cart 1506 being tugged along by the robot 402-2 does have its turn center 1502 aligned with the turn center of the robot 402-2.

One skilled in the art would appreciate that nested design of the cart 1506 inside a tug robot 402, as shown by tug robot 1704, provides significant advantages over the conventional designs. For example, the nested design results in a significantly shorter overall length of robot 402 and cart 1506 system, as shown by distance 1706 being greater than distance 1708 comprising a length of the robots 1702 or 1704 and cart 1506 systems, respectively. The nested design of robot 1704 fully encapsulates the cart 1506 physically to ensure safety while moving the cart 1506 autonomously (i.e. the design physically blocks a person from stepping in-between the robot 402 and cart 1506, and prevents their foot from getting run over by the cart wheels). This design could easily be enhanced with additional sensors (e.g., LiDAR, cameras, position and movement sensors) to provide a vertical safety curtain as well to ensure nothing is protruding from the sides of the cart 1506. This additional sensor could be integrated with the user interface and stop the robot 1702 or keep it from starting if the vertical safety curtain is triggered.

It will be recognized that while certain aspects of the disclosure are described in terms of a specific sequence of steps of a method, these descriptions are only illustrative of the broader methods of the disclosure and can be modified as required by the particular application. Certain steps can be rendered unnecessary or optional under certain circumstances. Additionally, certain steps or functionality can be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated can be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or embodiments can be understood and affected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including, but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes, but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that can be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein, "defined" or "determined" can include "predefined" or "predetermined" and/or otherwise determined values, conditions, thresholds, measurements, and the like.

What is claimed is:

1. A system for maneuvering a cart by a robot between different locations, comprising:
    the robot, wherein the robot comprises two longitudinal beams disposed at the rear of the robot, wherein the longitudinal beams are separated from each other by at least a distance equal to a width of the cart and comprise rear wheels, and the robot is configured to tow the cart when the cart is nested between the longitudinal beams;
    wherein the cart, when attached to the robot, comprises a same vertical center as the robot as the robot executes turns, the vertical center comprising a geometric axis within a center of the robot and the attached cart, the robot and the attached cart are constrained in movement perpendicular to the axis, and the cart and the robot comprise a same turn center corresponding to a point about which the same vertical center rotates during execution of the turns, the turn center disposed between the longitudinal beams;
    a memory having computer readable instructions stored thereon; and
    at least one processor configured to execute the computer readable instructions to:
    receive data from at least one sensor coupled to the robot; and
    maneuver the robot along a path upon detection of attachment of the cart to the robot by the at least one sensor, the cart being nested within the robot between the longitudinal beams, wherein the path is included in a computer readable map learned by the robot from user input during prior training and the path comprises poses of the robot relative to an environment based on sensor data from the at least one sensor.

2. The system of claim 1, wherein the at least one processor is further configured to execute the computer readable instructions to:
    switch the robot between an active mode and an inactive mode upon receiving input from the at least one sensor, wherein the at least one sensor corresponds to at least one switch, sensor unit, or input to a user interface.

3. The system of claim 2, wherein
    the active mode corresponds to the robot operating autonomously; and
    the inactive mode corresponds to the robot operating under user control, the inactive mode comprises disabling autonomous features of the robot, and the user control comprises pushing, pulling, or driving of the robot.

4. The system of claim 1, wherein the cart is nested within the robot by being attached to a latch module, and the latch module comprises:
    a latch including a notch at a distal end of the latch, the notch configured to engage and disengage the cart as the cart slides into an opening formed above the notch.

5. The system of claim 4, wherein
the cart is coupled to the robot via the latch module, and the latch module is configured to hold the cart in a fixed position relative to the robot.

6. The system of claim 1, the robot further comprising:
at least one second sensor configured to detect protrusions from the attached cart, the at least one second sensor comprising at least one of a LiDAR sensor, a camera, or motion sensor,
wherein the at least one processor is further configured to execute the computer readable instructions to stop the robot if a protrusion is detected by the at least one second sensor.

7. A non-transitory computer readable storage medium comprising a plurality of computer readable instructions embodied thereon, the instructions, when executed by a processor, configure the processor to:
receive data from at least one sensor coupled to a robot, wherein the robot comprises two longitudinal beams disposed at the rear of the robot, wherein the longitudinal beams are separated from each other by at least a distance equal to a width of a cart and comprise rear wheels, and the robot is configured to tow the cart when the cart is nested between the longitudinal beams;
wherein the cart, when attached to the robot, comprises a same vertical center as the robot as the robot executes turns, the vertical center comprising a geometric axis within a center of the robot and the attached cart, the robot and the attached cart are constrained in movement perpendicular to the axis, and the cart and the robot comprise a same turn center corresponding to a point about which the same vertical center rotates during execution of the turns, the turn center disposed between the longitudinal beams; and
maneuver the robot along a path upon detection of attachment of the cart to the robot by the at least one sensor, the cart being nested within the robot between the longitudinal beams, wherein the path is included in a computer readable map learned by the robot from user input during prior training and the path comprises poses of the robot relative to an environment based on sensor data from the at least one sensor.

8. The non-transitory computer readable storage medium of claim 7, wherein the computer readable instructions further configure the processor to:
switch the robot between an active mode and an inactive mode upon receiving input from the at least one sensor, wherein the at least one sensor corresponds to at least one switch, sensor unit, or input to a user interface.

9. The non-transitory computer readable storage medium of claim 8, wherein
the active mode corresponds to the robot operating autonomously; and
the inactive mode corresponds to the robot operating under user control, the inactive mode comprises disabling autonomous features of the robot, and the user control comprises pushing, pulling, or driving of the robot.

10. The non-transitory computer readable storage medium of claim 7, wherein the computer readable instructions further configure the processor to:
provide a control signal to a motor of a latch module to configure opening and closing of the latch module, the latch module further comprising:
a latch including a notch at a distal end of the latch, the notch configured to engage and disengage the cart as the cart slides into an opening formed above the first notch.

11. The non-transitory computer readable storage medium of claim 7, wherein the processor is further configured to execute the computer readable instructions to
receive data from at least one second sensor configured to detect protrusions from the attached cart, the at least one second sensor comprises at least one of a LiDAR sensor, a camera, or motion sensor; and
stop the robot if a protrusion is detected by the at least one second sensor.

12. A method for operating a robot as a tug, comprising:
providing the robot, wherein the robot comprises two longitudinal beams disposed at the rear of the robot, wherein the longitudinal beams are separated from each other by at least a distance equal to a width of a cart and comprise rear wheels, and the robot is configured to tow the cart when the cart is nested between the longitudinal beams;
wherein the cart, when attached to the robot, comprises a same vertical center as the robot as the robot executes turns, the vertical center comprising a geometric axis within a center of the robot and the attached cart, the robot and the attached cart are constrained in movement perpendicular to the axis, and the cart and the robot comprise a same turn center corresponding to a point about which the same vertical center rotates during execution of the turns, the turn center disposed between the longitudinal beams;
receiving data from at least one sensor coupled to the robot; and
maneuvering the robot along a path upon detection of attachment of the cart to the robot by the at least one sensor, the cart being nested within the robot, wherein the path is included in a computer readable map learned by the robot from user input during prior training and the path comprises poses of the robot relative to an environment based on sensor data from the at least one sensor.

13. The method of claim 12, further comprising:
switching the robot between an active mode and an inactive mode upon receiving input from the at least one sensor, wherein the at least one sensor corresponds to at least one switch, sensor unit, or input to a user interface.

14. The method of claim 13, wherein
the active mode corresponds to the robot operating autonomously;
the inactive mode corresponds to the robot operating under user control, the inactive mode comprises disabling autonomous features of the robot; and
the user control comprises pushing, pulling, or driving of the robot.

15. The method of claim 12, further comprising:
utilizing a latch module to attach the robot to the cart, the latch module comprising:
a latch including a notch at a distal end of the latch, the notch configured to engage and disengage the cart as the cart slides into an opening formed above the notch.

16. The method of claim 15, wherein
the cart is coupled to the robot via the latch module, and the latch module is configured to hold the cart in a fixed position relative to the robot.

17. The method of claim 12, further comprising:
receiving data from at least one second sensor configured to detect protrusions from the attached cart, the at least one second sensor comprising at least one of a LiDAR sensor, a camera, or motion sensor; and
stopping the robot if a protrusion is detected by the at least one second sensor.

\* \* \* \* \*